(12) United States Patent
Oza et al.

(10) Patent No.: US 11,272,350 B2
(45) Date of Patent: Mar. 8, 2022

(54) INTER NETWORK ROAMING BETWEEN INDEPENDENTLY MANAGED SATELLITE NETWORKS

(71) Applicant: Hughes Network Systems, LLC, Germantown, MD (US)

(72) Inventors: Rajeev Gautam Oza, Boyds, MD (US); George Joseph Choquette, Potomac, MD (US); Guy Bryan Montgomery, Potomac, MD (US); Suresh Kumar Korada, Boyds, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 31 days.

(21) Appl. No.: 16/829,974

(22) Filed: Mar. 25, 2020

(65) Prior Publication Data
US 2020/0344591 A1 Oct. 29, 2020

Related U.S. Application Data

(60) Provisional application No. 62/838,924, filed on Apr. 25, 2019.

(51) Int. Cl.
*H04W 8/08* (2009.01)
*H04W 8/24* (2009.01)

(52) U.S. Cl.
CPC ............... *H04W 8/08* (2013.01); *H04W 8/24* (2013.01)

(58) Field of Classification Search
CPC ......... H04W 8/08; H04W 8/24; H04W 48/08; H04W 84/06; H04W 8/20; H04W 8/12; H04W 28/12; H04W 36/0061; H04W 76/12; H04W 76/32; H04W 36/0088; H04W 4/025; H04W 92/20; H04B 7/18545; H04B 7/18508
See application file for complete search history.

(56) References Cited

U.S. PATENT DOCUMENTS

2007/0129003 A1    6/2007 Dunko
2015/0230074 A1*   8/2015 Zeng ..................... H04M 15/50
                                                    455/408
2018/0049019 A1*   2/2018 Haran ............... H04W 72/0493

FOREIGN PATENT DOCUMENTS

WO      2015134875 A1   9/2015

OTHER PUBLICATIONS

International Search Report and Written Opinion dated Aug. 27, 2020 in corresponding PCT/US2020/029912.

* cited by examiner

*Primary Examiner* — Fred A Casca
(74) *Attorney, Agent, or Firm* — NovoTechIP International PLLC

(57) ABSTRACT

Systems and methods are described, and one method includes receiving at a first network a request for a second network configuration data and an identifier of a first network home service plan of the mobile terminal, and transmitting to the second network an inter-network configuration data request. The inter-network configuration data request carries the request for the second network configuration data and an identifier of the mobile terminal's first network home service plan. The first network receives from the second network an inter-network configuration data response that carries the second network configuration data and, in response, transmits the second network configuration data to the mobile terminal.

18 Claims, 13 Drawing Sheets

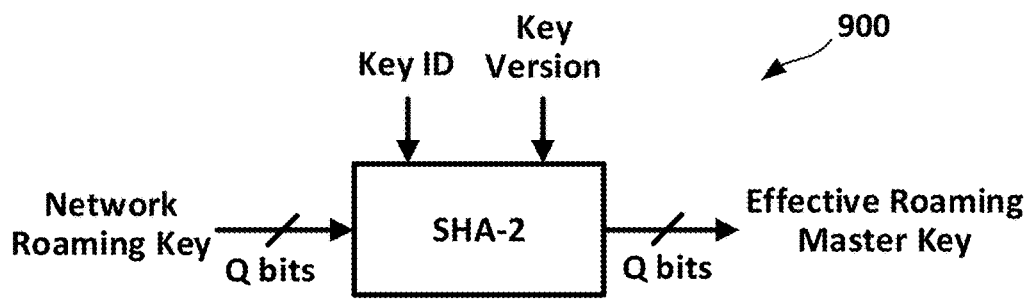
FIG. 9
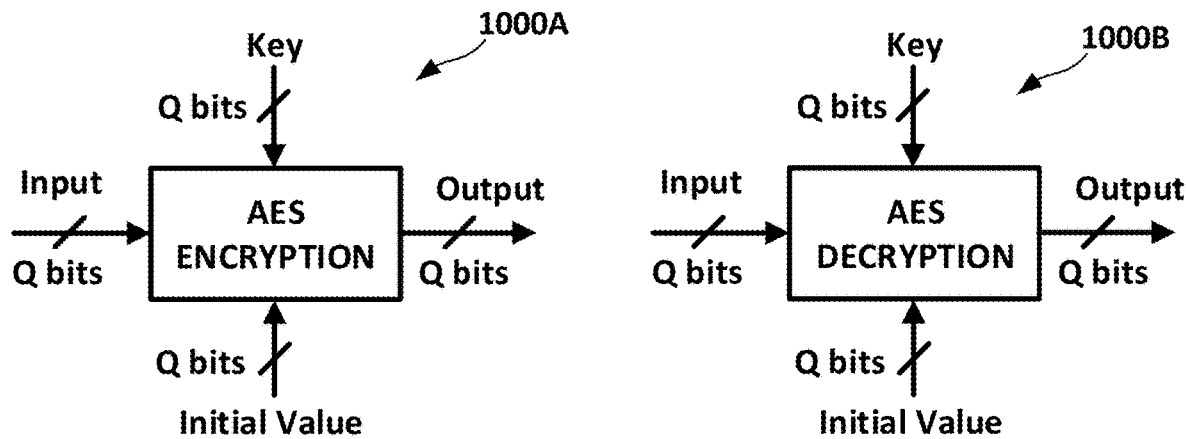
FIG. 10A  FIG. 10B
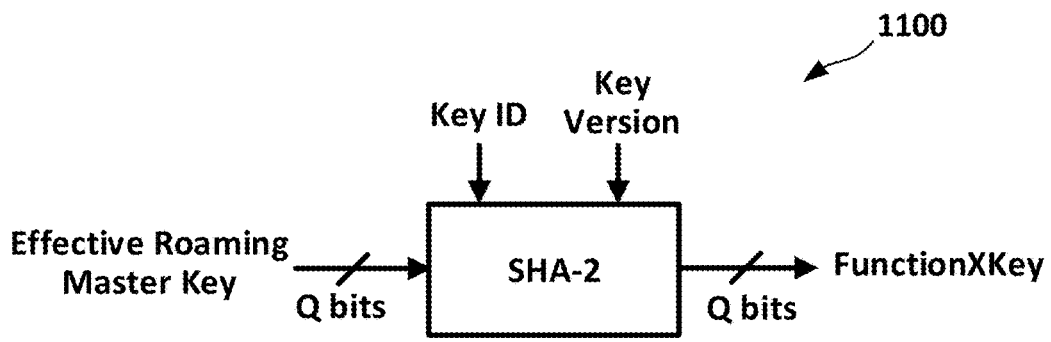
FIG. 11

INTER NETWORK ROAMING BETWEEN INDEPENDENTLY MANAGED SATELLITE NETWORKS

CROSS REFERENCE TO RELATED APPLICATION

This application claims the benefit of priority from U.S. Provisional Patent Application Ser. No. 62/838,924 filed Apr. 25, 2019, and titled "INTER NETWORK ROAMING BETWEEN INDEPENDENTLY MANAGED SATELLITE NETWORKS," which is incorporated by reference herein in its entirety.

BACKGROUND

In current satellite communication systems serving mobile terminals, when a terminal reaches the end of the coverage area of a managed network, the terminal will cease to have service.

A need exists for mobile terminals to exit the home network service area and, without interruption and without burdensome re-registration procedures, to enter and receive service in outside coverage areas serviced by other satellite networks, at a service quality and type corresponding to their home service plan.

SUMMARY

This Summary identifies example features and aspects and is not an exclusive or exhaustive description of the disclosed subject matter. Whether features or aspects are included in or omitted from this Summary is not intended as indicative of relative importance of such features. Additional features and aspects are described, and others will become apparent to persons skilled in the art upon reading the following detailed description and viewing the drawings that form a part thereof.

An example of disclosed systems can include a first network management logic associated with a first network and can include a second network management logic associated with a second network, and the first network management logic can be configured to receive a request for a second network configuration data, which can carry an identifier of an MT (mobile terminal) and, in response, can identify a first network HSP (home service plan) of the MT, and transmit to the second network management logic an inter-network configuration data request, which can carry the request for the second network configuration data and an identifier of the first network HSP of the MT. The first network management logic can be configured to receive from the second network management logic an inter-network configuration data response corresponding to the inter-network configuration data request, which can carry the second network configuration data and, in response, transmit the second network configuration data to the MT.

An example of disclosed methods can include receiving at a first network a request for a second network configuration data, the request including an identifier of a mobile terminal and, in response, identifying a first network HSP of the MT, and transmitting to the second network an inter-network configuration data request, which can carry the request for the second network configuration and can include an identifier of the first network HSP of the MT, and can include receiving from the second network an inter-network configuration data response, corresponding to the inter-network configuration data request and which can include the second network configuration data and, in response, transmitting the second network configuration data to the MT.

Another example of disclosed methods can include receiving a request for a visitor network configuration data, identifying as a requestor an MT registered to a home network management system; identifying an HSP for the MT, transmitting to the visitor network management system the HSP for the MT and the request for the visitor network configuration data, receiving from the visitor network management system a visitor network configuration data, corresponding to the request for the visitor network configuration data, and transmitting the visitor network equivalent configuration data to the MT.

BRIEF DESCRIPTION OF THE DRAWINGS

The figures depict one or more implementations in accord with the present teachings, by way of example only, not by way of limitation. In the figures, like reference numerals refer to the same or similar elements.

FIG. 9 is a diagram of an example logic for generating a master roaming key.

FIG. 10A is a diagram of an example logic for generating a challenge, for an authenticating in accordance with the present disclosure; FIG. 10B is a diagram of an example logic for authenticating the challenge.

FIG. 11 is a diagram of an example logic for generating a function key, for receiving functions in a visitor network management system.

DETAILED DESCRIPTION

In the following detailed description, numerous specific details are set forth by way of examples in order to provide a thorough understanding of the relevant teachings. However, it will be understood that the present subject matter may be practiced without such details. In various instances, one or more known methods, procedures, components, and/or circuitry are described at a relatively high-level, without detail, to avoid unnecessarily obscuring aspects of the disclosed subject matter.

Features of disclosed systems include, but are not limited to providing REMTs, when exiting a home network's coverage area toward outside coverage areas serviced by other networks, with configurations enabling the REMT, without interruption of service, to enter the other networks' coverage areas and receive service from the other network.

Features of disclosed systems can also include, in addition to providing REMTs with configurations for entering other networks' coverage areas, providing the REMTs in the other networks' coverage areas with a service plan the other networks' select, from their available service plans, that corresponds to the REMT's home network service plan.

Features of disclosed systems can also include, but are not limited to providing REMTs, in addition to configurations allowing exit from their home network and entry into other networks' coverage areas, with configurations to roam between different ones of the outside networks, and in each receive a service plan the other outside network selects, from its available service plans, that corresponds to the REMT's home network service plan.

Definitions

Mobile Terminals: can include, without limitation, aeronautical terminals, maritime terminals, terminals on trains, buses, automobiles, and any other mobile platform;

VNO: Virtual Network Operator can mean an entity that owns or leases bandwidth capacity in one or more satellite communication networks;

MNW: Managed Network;

NAP: Network Access Point, can be a gateway configured to provide Internet end point connection to mobile terminals in a network.

Figure 1:
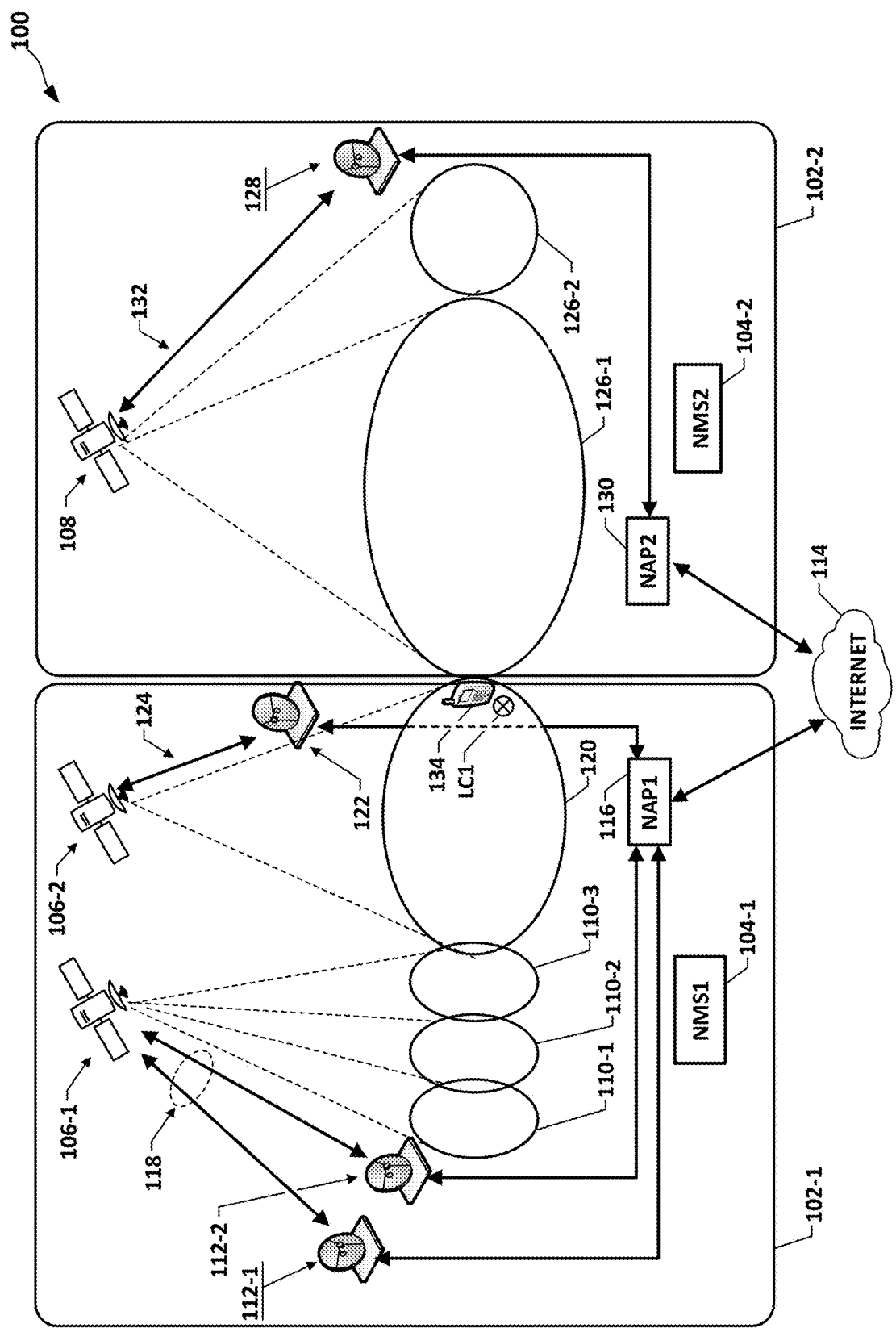
FIG. 1 is a functional block diagram of an example plurality of satellite based managed networks ("MNWs"), and respective spotbeams over geographical areas.

FIG. 1 is a logic block diagram of a first MNW 102-1 and second MNW 102-2, and their respective spotbeam coverages. The first MNW 102-1 is shown managed by a first NMS 104-1, and the second MNW 102-1 is managed by a second NMS 104-2. Satellite resources of the first MNW 102-1 are shown to include a first MNW first satellite 106-1 and a first MNW second satellite 106-2. Satellite resources of the second MNW 102-2 are shown to include one second MNW satellite 108. The first MNW first satellite 106-1 is shown providing three spotbeams, consisting of a first MNW first satellite first spotbeam 110-1, a first MNW first satellite second spotbeam 110-2, and a first MNW first satellite third spotbeam 110-3 (collectively "first MNW first satellite spotbeams 110"). The first MNW 102-1 includes a first MNW first satellite first gateway 112-1 and second gateway 112-2 (collectively "first MNW first satellite gateways 112"). The first MNW first satellite gateways 112 can access the Internet 114 via a first MNW network access point (NAP) 116. The first MNW first satellite gateways 112 can provide the Internet access to MTs (not separately visible in FIG. 1) within the first MNW first satellite spotbeams 110, via feed links 118 to satellite 106-1, and service links (not separately visible) between the satellite 106-1 and the MTs.

The first MNW second satellite 106-2 is shown providing a first MNW second satellite spotbeam 120. The first MNW 102-1 is shown to include a first MNW second satellite gateway 122 that can access the Internet 114 via the first MNW NAP 116. The satellite gateway 122 can provide Internet access to MTs (not separately visible in FIG. 1) within the first MNW second satellite spotbeam 120, via feed links 124 to the satellite 106-2 and service links (not separately visible) between said satellite and the MTs.

The second MNW satellite 108 is shown providing two spotbeams, consisting of a second NWM satellite first spotbeam 126-1 and second MNW satellite second spotbeam 126-2 (collectively "second MNW satellite spotbeams 126"). The second MNW 102-2 includes a second MNW satellite gateway 128, which can access the Internet 114 via a second MNW NAP 130. The gateway 128 can provide Internet access to MTs (not separately visible in FIG. 1) within the second MNW first spotbeam 126-1 and second spotbeam 126-2 via feed link 132 to the second MNW satellite 108, and service links (not separately visible) between said satellite and the MTs.

MTs within the first MNW 102-1 can move within each of, and can move among the first satellite spotbeams 110-1, 110-2, and 110-2, and can move within the first MNW spotbeam 120, and between 110-1, 110-2, 110-2, and 120. However, when an MT such as the example MT 134 is at location such as LC1 at the outer edge of the first MNW 102-1 coverage area, the MT cannot move any further from the center of the spotbeam 120 (e.g., from LC1 in a rightward direction on the FIG. 1 projection plane) without being disconnected from first MNW 102-1 service. If the MT 134 enters the coverage area of the second MNW 102-2 it will not only be disconnected from the first MNW 102-1, it will likely not receive any service, much less service equivalent or even acceptably equivalent to the MT's service plan in its home network, i.e., first MNW 102-1.

As used in this disclosure, "service plan" will be understood to encompass, without limitation, a plurality of different configurations of services, respectively defining different service type(s), different limits, and different guarantees of service that an MT receives. An example service plan can include, but is not limited to, download throughput, upload throughput, service area definition, quality of service (QoS) classes, and traffic prioritization rules. For brevity, subsequent description will interchangeably recite "home service plan" as "HSP."

An example implementation in accordance with this disclosure can include a first network management logic associated with a first satellite network, and a second network management logic associated with a second satellite network. Implementations of the first and second satellite network can utilize, for example, satellite resources, gateways, and an NAP such as, without limitation, the satellite resources, gateways and NAP included in the system 100 first and second MNWs 102.

The first network management logic, in addition to providing various NMS functionalities provided by the first network NMS 104-1, can include particular roaming management features and aspects, and various combinations and implementations thereof. Roaming management features of the first network management logic can include, for example, reception of a request for a second network configuration data, and the request can include an identifier of the sending MT. The sending MT can be home registered on the first network. The MT may send the request upon detecting its exit from a perimeter of the first network coverage area and approaching entry into a coverage area of the second satellite network. For purposes of description, MTs configured to detect exiting from one MNW and entering MNW and, in response, send CDRs will be referred to as "roaming enabled" MTs. For brevity, "roaming enabled MT" will also be abbreviated as and mutually interchangeable with "REMT." It will be understood that, as used herein, "REMT" has no intrinsic meaning.

Roaming management features of the first network management logic can include, in response to receiving the request for the second network configuration data, looking up the first satellite network home service plan of the requestor REMT, and transmitting to the second network management logic an inter-network configuration data request. The inter-network configuration data request can carry the request for the second network configuration data, and an identifier of the first network home service plan of the requestor REMT.

Roaming management features of the first network management logic can also include receiving from the second network management logic an inter-network configuration data response, which can carry the requested second network configuration data. The first network management logic can, in response, forward or send the second network configuration data to the requestor REMT. Features and benefits provided by the described operations and message exchanges and can include, but are not limited to, enablement of the requestor REMT, upon receiving the second network configuration data, to configure itself to enter the coverage area of the second satellite network and receive therein, without interruption, second satellite network service.

Additional features and benefits can be provided by roaming management features of the second network management logic for responding to the inter-network configuration data request received from the first satellite network. Such additional features and benefits can include, but are not limited to, the second network management logic reading from the received inter-network configuration data request identifiers of the requestor REMT's home network and of the requestor REMT's first network home service plan. Features of the second network management logic can also include selecting, based on the identifiers of the requestor REMT's home, i.e., first network and of the requestor REMT's first network home service plan, a service plan from among available second network service plans corresponding to the requestor REMT's first network home service plan.

Roaming management features of the second network management logic can include, without limitation, storage or other access to a service plan mapping, of a plurality different first network home service plans to corresponding second network service plans. Features of the second network management logic can also include inputting or applying to the service plan mapping the requestor REMT's home network identifier and the identifier of the requestor REMT's home service plan. The service plan mapping that is stored or otherwise accessible to the second network management logic can be established by, for example and without limitation, one or more partnership or other cooperative agreements between REMT's home network and the second network. In an aspect, the first network management logic and second network management logic can be comparably configured, including a service plan mapping stored or otherwise accessible to the first network management logic and which includes service plan mapping, of a plurality different second network home service plans to corresponding first network service plans. Accordingly, REMTs registered on the second network can, as described for REMTs home registered on the first network, send the second network management logic requests for first network configuration data, and through message exchanges and operations as described above, can be provided with the requested data and thus enabled to exit the second network and enter the first network.

Further features and benefits provided by implementations in accordance with this disclosure can include, without limitation, minimization of disruption time at the time of network switch. Still further benefits can include, but are not limited to, providing network operators an ability to lease bandwidth and other resources to a partner network such that terminals from that partner network can get service in a visitor network.

One or more implementations can further feature critical configuration messages that can be signed by using cryptographically strong encryption algorithms and keys to prevent man-in-the-middle, denial of service, replay or other modes of attack.

Figure 2:
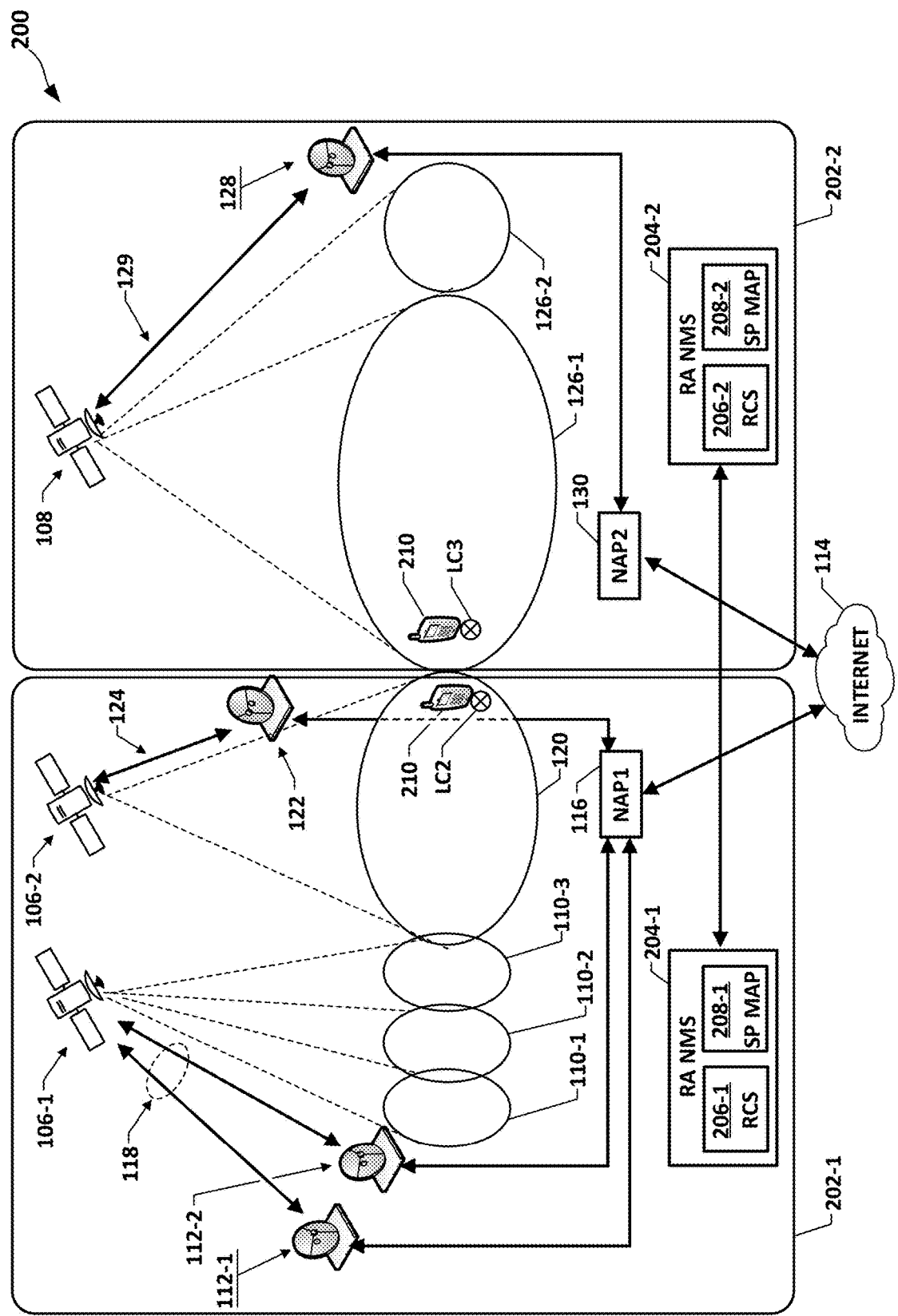
FIG. 2 is a functional block diagram of an example HSP roaming multiple MNW system with example features including logic for configuring roaming enabled MTs to roam from their home MNWs as visitors in other of the MNWs, and therein to receive service according to a visitor service plan to the which the visiting MT's HSP maps.

One or more implementations can also provide, without limitation, mobile terminals configured to store configurations of visited networks in memory, and this can in turn can provide increased speed of switching and bandwidth efficiency. FIG. 2 is a functional block diagram of an example HSP roaming multi-MNW system with example features including logic for configuring REMTs to roam from their home MNWs as visitors in other of the MNWs, and further configuring visitor REMTs to roam between other MNWs and, in each, to receive service according to a visitor SP to the which the visiting REMT's HSP maps.

FIG. 2 is a functional block diagram of an example HSP roaming multi-network system 200 (referenced hereinafter, for brevity, as "system 200"). The FIG. 2 example system 200 is shown as including a first satellite MNW 202-1 and a second satellite MNW 202-2. It will be understood that the FIG. 2 first and second satellite MNW 202-1 and 202-2 can be examples from a larger number of similarly configured MNWs (not visible in FIG. 2), and are not intended as a limit on, or as any indication of preference as to the number of satellite MNWs that can be included in a system according to the concepts and features system 200. To avoid obfuscation by description of details not necessarily specific to practices of disclosed concepts, FIG. 2 shows implementations of the first satellite MNW 202-1 and the second satellite MNW 202-2 using various blocks of the system 100 first and second satellite MNWs 102-1 and 102-2. The FIG.

2 implementation of the first satellite MNW 202-1, for example, is shown as incorporating the satellite resources 106-1 and 106-2, gateway resources 112-1, 112-2, and 122, and NAP 116 of the system 100 first satellite MNW 102-1. The FIG. 2 implementation of the second satellite MNW 202-2 is shown as incorporating the system 100 second MNW 102-2 satellite resources 108, gateway 128, and NAP 130.

Implementation of system 200 can include replacement of the system 100 first network NMS 104-1 with a first network management resource 204-1 and replacement of the system 100 second network NMS 104-2 with a second network management resource 204-2. The first network management resource 204-1 can include various NMS features of NMS 104-1, and can further include a roaming management resource that can be implemented, for example, by a first server 206-1 and a first network service plan mapping 208-1. The second network management resource 204-2 can likewise include NMS features of the second network NMS 104-2, and can further include a roaming management resource that can be implemented by a second server 206-2 and a second network service plan mapping 208-2. For purposes of description, the first network management resource 204-1 will be referred to as "first network NMS/resource management logic" 204-1, and the second network management resource 204-2 will be referred to as "second network NMS/resource management logic" 204-2. For brevity, "first network NMS/resource management logic" 204-1 and "second network NMS/resource management logic" 204-2 will be alternatively recited as "first NMS/RML" 204-1 and "second NMS/RML" 204-2, respectively. The first server 206-1 can be configured to provide, as described in greater detail later, various roaming REMT processes, process combinations, aspects and operations thereof.

As will be described in greater detail, later logic features provided by the first NMS/RML 204-1 can include, without limitation, logic for configuring REMTs currently registered in the first satellite MNW 202-1 to roam as visitors into the second satellite MNW 202-2 and therein receive service according to a second network visitor service plan. In an aspect, the second network visitor service plan can be selected from among available second network visitor service plans by a mapping of first network home service plans to second network home service plans. The second NMS/RML 204-2 can include comparable features, e.g., logic for configuring REMTs currently registered in the second satellite MNW 202-2 to roam as visitors into the first satellite MNW 202-1 and therein receive service according to a first network visitor service plan. The first network visitor service plan can be selected from among available first network visitor service plans by a mapping of second network home service plans to first network home service plans.

For purposes of description, the first server 206-1 will also be referred to as a first network "roaming configuration server" 206-1, and the second server 206-2 will also be referred to as a second "roaming configuration server" 206-2. For brevity "roaming configuration server" will also be recited as "RCS." The first NMS/RML 204-1's network service plan mapping 208-1 can include a mapping of a plurality of different service plans available via the second satellite MNW 202-2 to corresponding service plans available via or through the first satellite MNW 202-1. The second NMS/RML 204-2's network service plan mapping 208-2 can include a mapping of a plurality of different service plans available via the first satellite MNW 202-1 to corresponding service plans available via or through the second satellite MNW 202-2.

Features of the first network RCS 206-1 can include, but are not limited to, being a sender of communications to the second network RCS 206-2 for configuration data to enable requestor REMTs currently registered in the first satellite MNW 202-1 to enter as a visitor, and receive service in the second satellite MNW 202-2. The first network RCS 206-1 can send such communications for example, in response to communication data requests sent by a requestor REMT currently registered in the first satellite MNW 202-1 that is leaving and entering a coverage area of the second satellite MNW 202-2. For purposes of description, the communication data requests will be referred to as "CDRs," and such communications from the first network RCS 206-1 to the second network RCS 206-2 carrying the CDRs will be referred to as "inter-network CDReq." For purposes of example, FIG. 2 shows one REMT 210 at location LC2 that is near an outer perimeter of spotbeam 120 of first MNW 202-1, superposed with a graphical representation of the REMT 210 after having moved to location LC3 in spotbeam 126-1 of the second satellite MNW 202-2.

Features of the second network RCS 206-2 can likewise include, but are not limited to, being a sender of inter-network CDReqs to the first network RCS 206-1 for configuration data to enable requestor REMTs currently registered in the second satellite MNW 202-2 to enter as a visitor, and receive service in the first satellite MNW 202-1. The second network RCS 206-2 can send such inter-network CDReqs for example, in response to CDRs sent by a requestor REMT currently registered in the second satellite MNW 202-2 that is leaving and entering a coverage area of the first satellite MNW 202-1.

It will be assumed, for purposes of describing example operations of the system 200, that requestor REMTs currently registered in the first satellite MNW 202-1 and sending CDRs to the first network RCS 206-1 are home registered in the first satellite MNW 202-1. Further aspects are described in greater detail later, for example, in reference to FIGS. 7, 8A, and 8B and elsewhere, for REMTs currently registered in the first satellite MNW 202-1, but home registered for example in the second satellite MNW 202-2, to send CDRs to the first network RCS 206-1 for configuration data to enter another satellite MNW (not visible in FIG. 2).

The above-described inter-network CDReq sent from the first network RCS 206-1 to the second network RCS 206-2 can include an identifier of the requestor REMT's home network, which in this example is the first satellite MNW 202-1, an identifier of the requestor REMT, and an identifier of the requestor REMT's home network service plan. The inter-network CDReq sent from the second network RCS 206-2 to the first network RCS 206-1 can include an identifier of the requestor REMT's home network, which in this example is the second network, i.e., the second satellite MNW 202-2, an identifier of the requestor REMT, and an identifier of the requestor REMT's home network service plan. For purposes of description, the identifier of the requestor REMT's home network, which in this example is the second satellite MNW 202-2, will also be referred to as "HNW ID," and the identifier of the requestor REMT and the identifier of the requestor REMT's home network service plan will also be referred tom respectively, as "MT ID" and "HSP ID."

Features of the first network RCS 206-1 can include, in response to receiving an inter-network CDReq from the second network RCS 206-2, applying the HNW ID and HSP ID content of the inter-network CDReq to the first NMS/RML 204-1 service plan mapping 208-1. This can obtain a corresponding, i.e., mapped-to one of the first network, i.e., first satellite MNW 202-1 network service plans. For purposes of description, the plurality of first satellite MNW 202-1 service plans to which second satellite MNW 202-2 service plans can map can be referred to as "first network visitor service plans." The first network RCS 206-1 can be further configured to send to the second network RCS 206-2, in response to the inter-network CDReq, a first network configuration data that defines the mapped-to first network visitor plan. The first network RCS 206-1 can be configured to send the first network configuration data to the second network RCS 206-2 by an inter-network communication data response. For purposes of description, the inter-network communication data response will also be referred to as "inter-network CDRsp." The first network configuration data can be carried in or by the inter-network CDRsp, for example, as a .zip file. In an aspect, the first network configuration data carried in or by the inter-network CDRsp can include a carrier plan or at least the carrier ID for the specific beam of the first satellite MNW 202-1 into which the visitor REMT from the second satellite will first enter.

The second network RCS 206-2 can be configured to respond to receipt of the described inter-network CDRsp from the first network RCS 206-1, by forwarding the CDRsp, or the first network configuration data content thereof, to the second network requestor REMT. The second network requestor REMT, upon receiving the .zip file, can configure itself to enter the first satellite MNW 202-1 and, without interruption, receive service according to the mapped-to first network 202-1 visitor service plan.

It will be understood that the above-described examples of inter-network communications, e.g., inter-network CDReq and inter-network CDRsp, are inter-network in a logic sense. For example, an implementation of the inter-network CDReq sent from the second network RCS 206-2 to the first network RCS 206-1 may be physically transmitted from the second network RCS 206-2, or from an agent of the second network RCS 206-2, to an agent of the first network RCS 206-1. In another example, an independent third party can maintain a database, for each of the first satellite MNW 202-1 and second satellite MNW 202-2 of, for example, current REMT home registrations, current visitor REMT registrations, as well as copies each REMT's current HSP, and copies of the first network service plan mapping 208-1 and second network service plan mapping 208-2. In such an implementation, inter-network CDReq and inter-network CDRsp can be performed, for example, on the database(s), and does not necessarily include direct communication between the satellite networks 202-1 and 202-2.

The second NMS/RML 204-2 can store or otherwise have access to a second network service plan mapping 208-2. The second network service plan mapping 208-2 can map a plurality different first MNW 202-1 home service plans to corresponding second satellite MNW 202-2 service plans (not separately visible in FIG. 2). For purposes of description, the plurality of second network service plans to which first network home service plans can map can be referred to as "second network visitor service plans."

Features of the second network RCS 206-2 can include, in response to receiving an inter-network CDReq from the first network RCS 206-1, applying the HNW ID and HSP ID content of the inter-network CDReq to the second network service plan mapping 208-2. This can obtain a corresponding, i.e., mapped-to one of the second network, i.e., second satellite MNW 202-2 network service plans. Features of the second network RCS 206-2 can include accessing the second satellite MNW 202-2 service plan mapping 208-2 in response to receiving an inter-network CDReq from the first network RCS 206-1. The first network RCS 206-1 can send the inter-network CDReq, for example, upon receiving a CDR from a requestor first network REMT leaving the first satellite MNW 202-1. The second network RCS 206-2 response to the inter-network CDReq from the first network RCS 206-1 can include applying the received inter-network CDReq content HNW ID and HSP ID to the second satellite MNW 202-2 service plan mapping 208-2 to obtain a corresponding, i.e., mapped-to, one of the second network visitor service plans.

The second network configuration data defining the mapped-to second network visitor service plan can be included in an inter-network CDRsp the second network RCS 206-2 can send to the first network RCS 206-1. The second network configuration data can be carried, for example, as a .zip file by the inter-network CDRsp sent by the second network RCS 206-2. The first network RCS 206-1, upon receipt, can forward the second network configuration data to the first network requestor REMT. In an aspect, the first network requestor REMT, upon receiving the .zip file, can configure itself to enter the second satellite MNW 202-2 and, without interruption, receive according to the mapped-to second network 202-2 visitor service plan.

As an illustrative scenario, it will be assumed that service plans available from the first satellite MNW 202-1 include a first network first plan and a first network second plan, which can be referred to as "Network1-Plan1" and "Network1-Plan2." It will also be assumed that service plans available from the second satellite MNW 202-2 include a second network first plan and a second network second plan, which will be referred to as "Network2-Plan1" and "Network2-Plan2," respectively.

In the example scenario, the first network service plan mapping 208-1 can store or otherwise provide access to a mapping of each of Network2-Plan1 and Network2-Plan2 to a corresponding one of Network1-Plan1 and Network1-Plan2. In the context of the first network RCS 206-1 service plan mapping, Network1-Plan1 and Network1-Plan2 can be referred to as "visitor service plans."

The first network RCS 206-1, upon receiving an inter-network CDReq from the second network RCS 206-2, can apply the HNW ID and HSP ID carried by said inter-network CDReq to the first network service plan mapping 208-1. The first network service plan mapping 208-1 can output or indicate one among Network1-Plan1 and Network1-Plan2 as a corresponding service plan.

One arbitrary example configuration for the above-described first satellite MNW 202-1 service plan mapping can be in accordance with the following mapping Table 1.

TABLE 1

| Service Plan Mapping, Network2 Home, Network1 Visitor | | |
| --- | --- | --- |
| Home Network | Home Service Plan | Visitor Service Plan (at Network1) |
| Network2 | Network2-Plan1 | Network1-Plan1 |
|  | Network2-Plan2 | Network1-Plan1 |
|  | Default | Network1-Plan2 |

As shown in the example Table 1, implementations can provide a "default" mapping. The default mapping can cover applications where, for example, a home network changes a service plan in home that does not necessarily change service plans in a visitor network. As also shown in Table 1, different home network service plans, e.g., Network2-Plan1 and Network2-Plan1, can map to the same service plan, e.g., Network1-Plan1, on a visitor network.

Further to the example above, the second satellite MNW 202-2 service plan mapping 208-2 can map each of Network1-Plan1 and Network1-Plan2 to a corresponding one of Network2-Plan1 and Network2-Plan2." The second network RCS 206-2, upon receiving a first network to second network inter-network CDReq from the first network RCS 206-2, can apply the HNW ID and HSP ID carried by said inter-network CDReq to the second network service plan mapping 208-2. The service plan mapping 208-2 can, in turn, output or indicate one among Network2-Plan1 and Network2-Plan2 as a corresponding second network visitor service plan.

One example of a particular configuration of above-described second RCS 206-2 mapping can be in accordance with the following mapping Table 2:

TABLE 2

Service Plan Mapping, Network1 Home, Network2 Visitor

| Home Network | Home Service Plan | Visitor Service Plan (at Network2) |
|---|---|---|
| Network1 | Network1-Plan1 | Network2-Plan2 |
|  | Network1-Plan2 | Network2-Plan1 |
|  | Default | Network2-Plan2 |

In the example mappings described above, the first satellite MNW 202-1 service plans appear in Table 2 as home service plans and in Table 1 as visitor service plans. For example, Network1-Plan2 appears in Table 2 as a home service plan, and appears in Table 1 as a visitor service plan. In various implementations, for one or more of the networks, one or more of the network's home service plans may have features, e.g., specific conditions or guarantees, that can be defined differently for REMTs home registered with the network than for visitor REMTs home registered with another network. Stated differently, for the first satellite MNW 202-1, or the second satellite MNW 202-2, or both, one or more the network's service plans as applied to REMTs home registered with the network are not necessarily identical, in all aspects, to its service plans as applied to visitor REMTs home registered with the other network.

The FIG. 2 first network or first satellite MNW 202-1 uses the FIG. 1 first network NAP 116 for Internet access, and the second network or second satellite MNW 202-2 accesses the Internet through the FIG. 1 second network or second satellite MNW 102-1 NAP 130. Therefore, when a REMT home registered on the first satellite MNW 202-1 is a visitor in the second satellite MNW 202-2, and receiving service therein according to a second network visitor service plan as described above, the REMT's access to the Internet 114 can be via the second network gateway 128 and through the second network NAP 130. Similarly, when a REMT home registered on the second satellite MNW 202-2 is a visitor in the first satellite MNW 202-1, and receiving service therein according to a first network visitor service plan as described above, the REMT's access to the Internet 114 can be via the one of the gateways 112 and 122, and through the first network NAP 116.

A further implementation can replace one or both of the NAPs 116 and 130 with a NAP logic that can feature a selective route-back-to-home NAP logic. An implementation of the selective route-back-to-home NAP logic can connect visitor REMTs to the Internet through an NAP of the home network of the visitor REMT's home network NAP, as opposed to the NAP of the visitor network. For example, referring to FIG. 2, an implementation of a selective route-back-to-home NAP logic can replace the second network NAP 130. One example of such an implementation can connect REMTs home registered on the second satellite MNW 202-2 to the Internet 114 as shown by the NAP 130 of FIG. 2, but not provide such access to visitor REMTs home registered on the first satellite network 202-1. The implementation can instead route visitor REMTs home registered on the first satellite MNW 202-1 back to their home network NAP 116, or to a home (i.e., first) network selective route-back-to-home NAP logic that replaces NAP 116.

Figure 3:
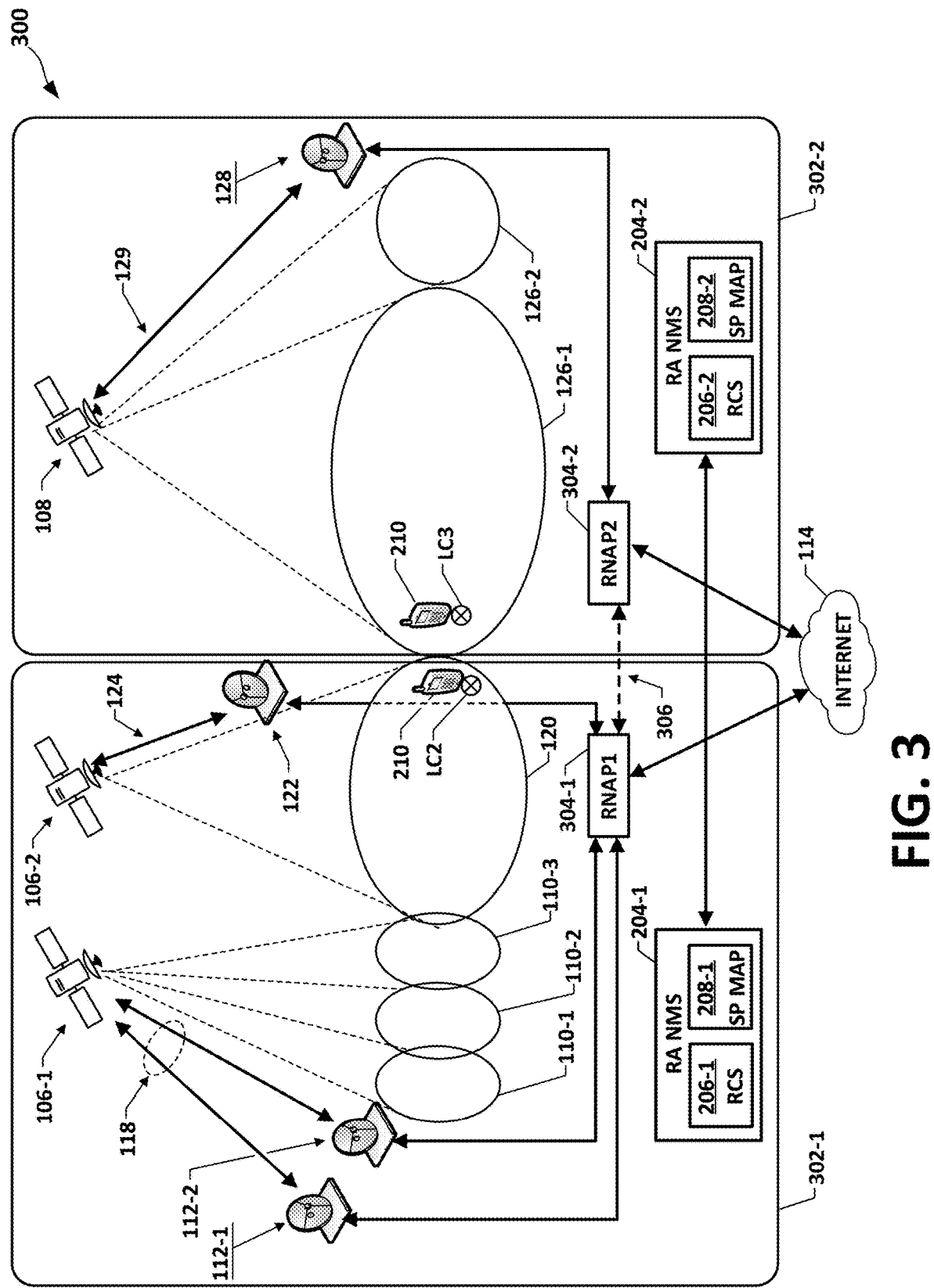
FIG. 3 is a functional block diagram of another example HSP roaming multiple MNW system, which includes logic features of the FIG. 2 system, and further includes an example implementation of a selective route-back-to-home network access point (NAP) logic in accordance with an aspect.

FIG. 3 is a functional block diagram of an example HSP roaming multi-MNW system 300 (hereinafter "system 300"), which includes logic features of the FIG. 2 system, and further includes an example implementation of a selective route-back-to-home network NAP logic in accordance with an aspect. The system 300 can include a first satellite MNW 302-1 and a second satellite MNW 302-2. The example implementation of the first satellite MNW 302-1, as shown in FIG. 3, can carry all blocks of the system 200 first satellite MNW 202-1, except for replacing the first network NAP1 116 with a first network route-back-to-home NAP 304-1, which is labeled on FIG. 3 and hereinafter referred to as first network "RNAP1" 304-1. The example implementation of the second satellite MNW 302-2 can likewise carry all blocks from the system 200 second satellite MNW 202-2, except for replacing the second network NAP2 130 with a second network RNAP 304-2.

In association with or included in implementation of the first network RNAP1 304-1 and second network RNAP2 304-2, the system 300 can include a route-back channel 306 that can prevent visitor REMTs from direct access to the Internet.

An example implementation of the route-back channel 306 can include virtual private networks (VPNs), for example, between the first NMS/RML 204-1 and second NMS/RML 204-2.

In an aspect, the first network RNAP1 304-1 can include a first network interface (visible in part in FIG. 3 but not separately numbered), an Internet interface (visible in FIG. 3 but not separately numbered), and a routing logic (not explicitly visible in FIG. 3). The first network interface can be configured to receive, e.g., via service links (not explicitly visible in FIG. 3) within spot beams 110 to the first network first satellite 106-1, over feed links 118 to the first network first and second gateways 112, and through the gateways 112, or over service links (not explicitly visible in FIG. 3) within spot beam 120 to the first network second satellite 106-2, over feed links 124 to the first network third gateway 124, and through the gateway 124, or both, a first network home REMT traffic (not explicitly visible in FIG. 3) generated by one or more REMTs home registered on the first satellite MNW 302-1. The first network RNAP1 304-1 first network interface can be configured to also receive a first network visitor traffic (not visible in FIG. 3) generated by one or more visitor REMTs (not visible in FIG. 3) home registered on the second satellite MNW 302-2. The routing logic of the first network RNAP1 304-1 can be configured to send the first network home REMT traffic, based at least in part on being generated by REMTs home registered on the first satellite MNW 302-1, directly to the Internet 114 for routing to the traffic's one or more Internet destinations. The first network RNAP1 304-1 can also be configured to send the first network visitor traffic, based at least in part on being generated by visitor REMTs home registered on the second satellite MNW 302-2, over the route-back channel 306 to the second network RNAP2 304-2.

In an implementation, the second network RNAP2 304-2 can include a second network interface (visible in part in FIG. 3 but not separately numbered), an Internet interface (visible in FIG. 3 but not separately numbered), and a routing logic (not explicitly visible in FIG. 3). The second network interface of the second network RNAP2 304-2 can be configured to receive, e.g., via service links (not explicitly visible in FIG. 3) within spot beams 126 to the second network satellite 108, feed links 132 to the second network gateway 128, and through the gateway 128, a second network home REMT traffic (not explicitly visible in FIG. 3) generated by one or more REMTs home registered on the second satellite MNW 302-2. The second network RNAP2 304-2 second network interface can be configured to also receive a second network visitor traffic (not visible in FIG. 3) generated by one or more visitor REMTs home registered on the first satellite MNW 302-1. The routing logic of the second network RNAP2 304-2 can be configured to send the second network home REMT traffic, based at least in part on being generated by REMTs home registered on the second satellite MNW 302-2, directly to the Internet 114 for routing to the traffic's one or more Internet destinations. The second network RNAP2 304-2 can be also configured to send the second network visitor traffic, based at least in part on being generated by visitor REMTs home registered on the first satellite MNW 302-1 over the route-back channel 306 to the first network RNAP1 304-1.

Figure 4A:
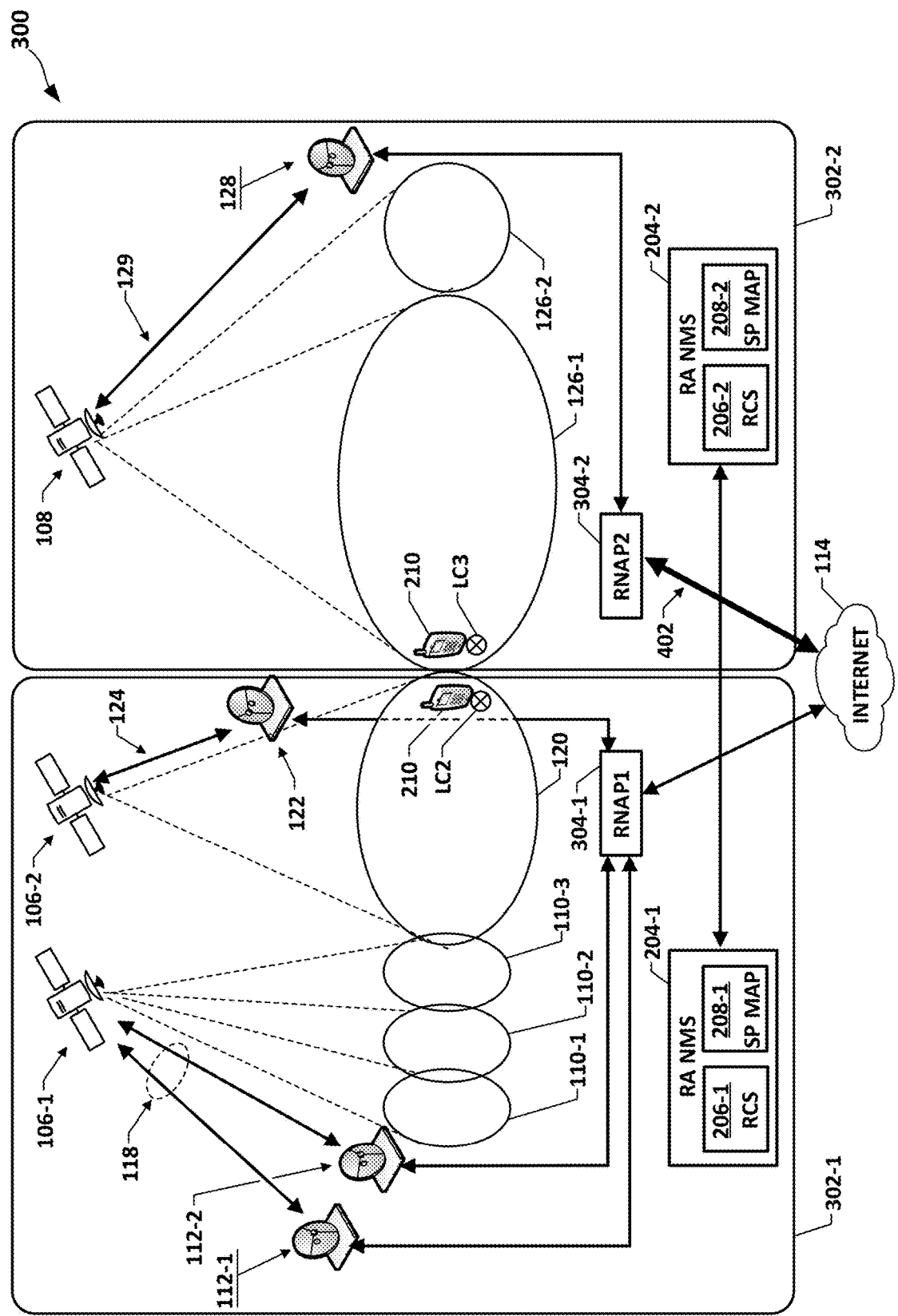
FIG. 4A shows the FIG. 3 system, and further shows an Internet access route for first MNW home registered MTs when visiting in the second MNW, while the second MNW's selective route-back-to-home NAP logic is in an inactive, i.e., no route-back mode.

FIG. 4A shows the FIG. 3 system, and further shows an Internet access route 402 for first satellite MNW 302-1 home registered REMTs when visiting in the second satellite MNW 302-2, when the routing logic of the second network RNAP2 304-2 is in an inactive, i.e., not route-back mode. Stated differently, in an example implementation, the routing logic of the second network RNAP2 304-2 is in the inactive state can route directly to the Internet traffic from all REMTs currently registered in the second satellite MNW 302-2, irrespective of home registration.

Figure 4B:
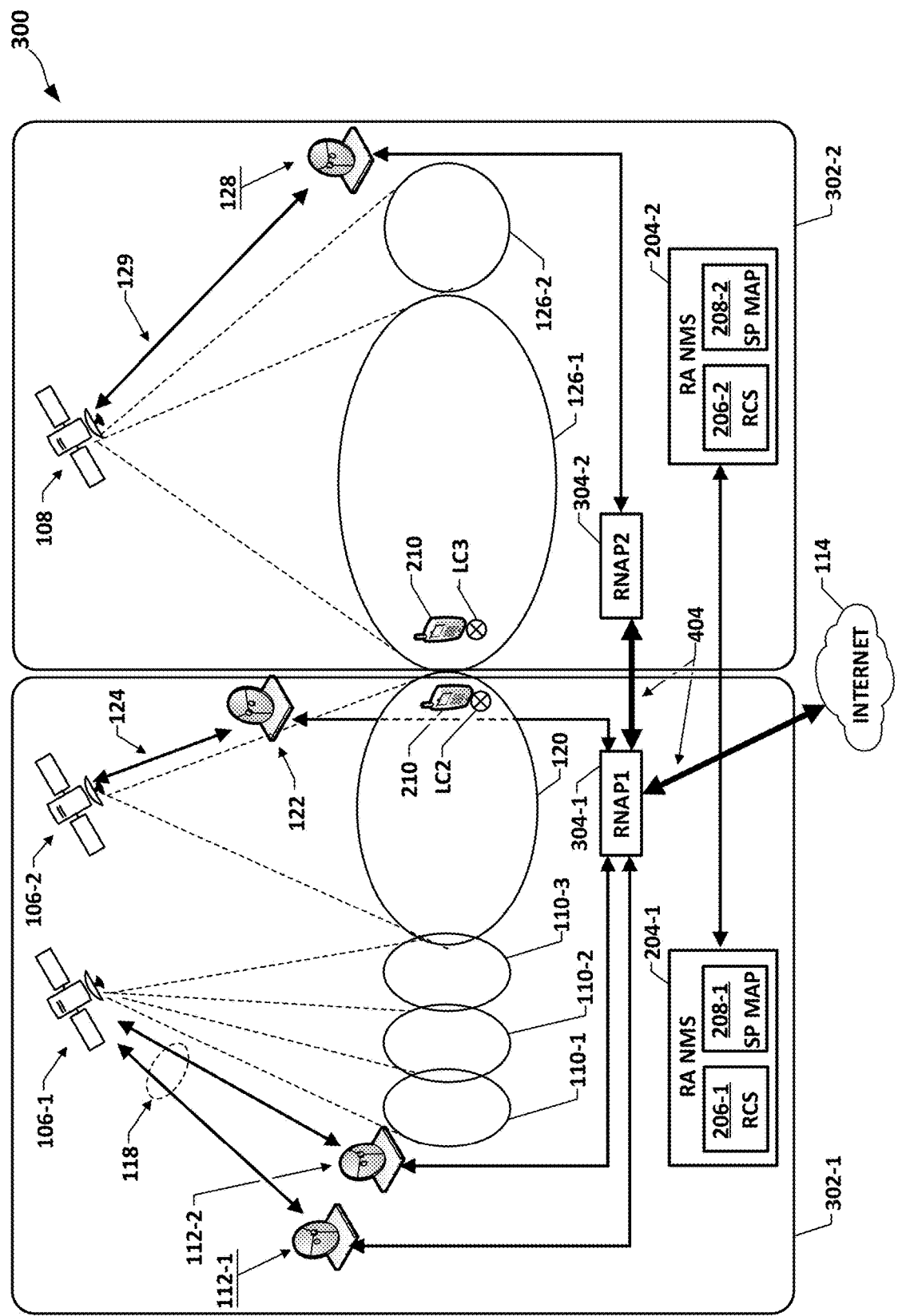
FIG. 4B shows the FIG. 3 system and further shows an Internet access route for first MNW home registered roaming enabled MTs (REMTs) when visiting in the second MNW, while the second MNW's elective route-back-to-home NAP logic is in an active, i.e., route-back mode.

FIG. 4B shows the FIG. 3 system and further shows a route-back, indirect Internet access route 404 for visitor traffic from first satellite MNW home registered REMTs when visiting in the second satellite MNW 302-2, while the routing logic of the second network RNAP2 304-2 is in an active route-back mode or state. In an implementation, traffic through the route-back, indirect Internet access route 404 can be unable to directly reach destination addresses within the Internet. Reachability can be defined, permitted, or restricted, for example, by access rules and processes implemented in the first network RNAP1 304-1.

Figure 5A:
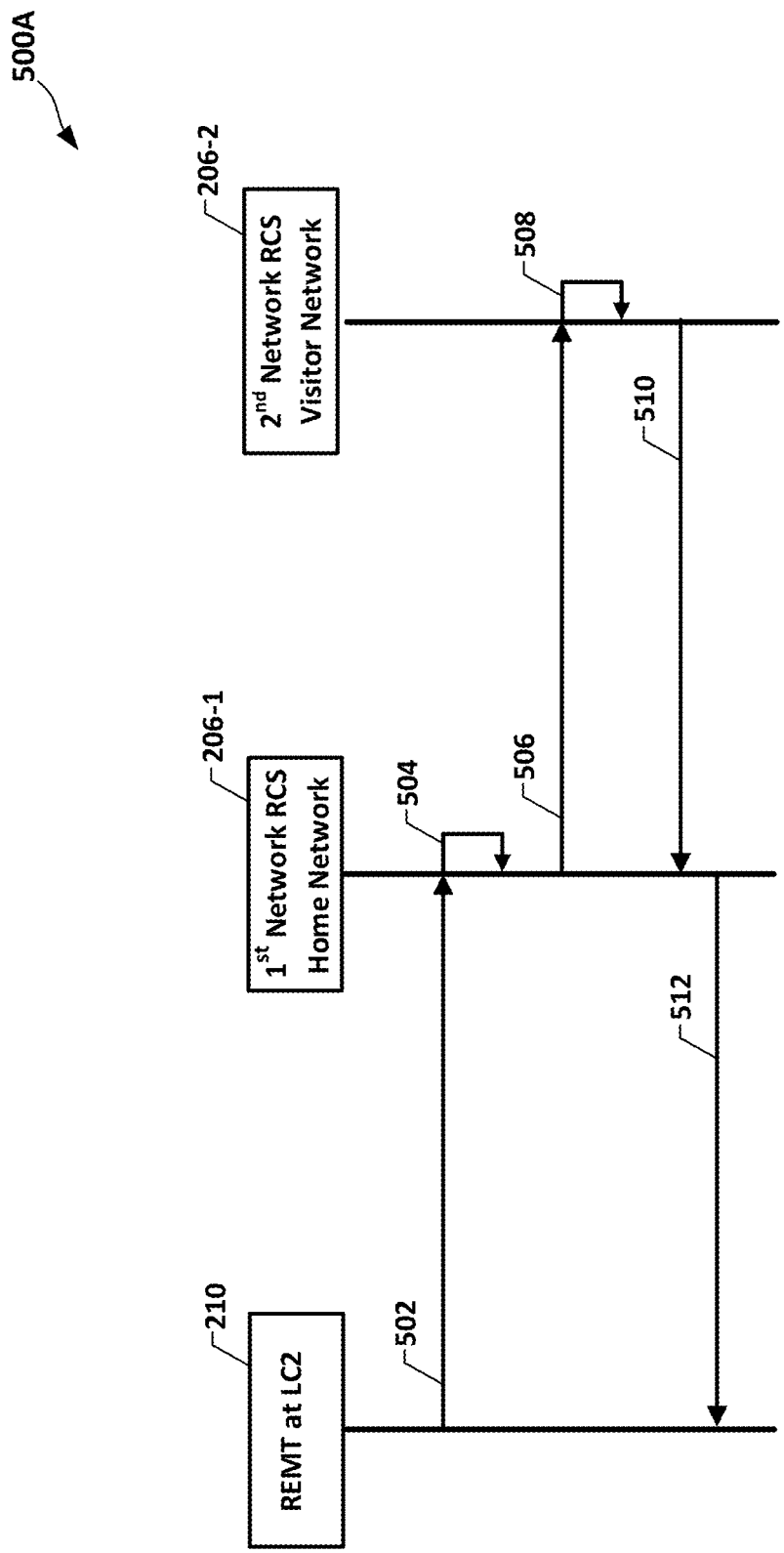
FIG. 5A is a sequence diagram of example message exchanges in processes of configuring a REMT home registered on one of the two FIG. 3 MNWs to enter the other of the two networks and therein receive a mapped service.

FIG. 5A is a sequence diagram of example message exchanges in a process 500A for configuring a the REMT 210 to exit its home network, e.g., the first satellite MNW 202-1 or first satellite MNW 302-1, and enter a visitor network, e.g., the second satellite MNW 202-2 or second satellite MNW 302-2, and therein receive service according to a second satellite MNW 202-2 or second satellite MNW 302-2 visitor service plan to which the REMT's first network HSP maps. processes of configuring a REMT home registered on one of the two FIG. 3 MNWs to enter the other of the two networks and therein receive a mapped service.

To reduce repeated recitations of "first satellite MNW 202-1 or first satellite MNW 302-1," and "second satellite MNW 202-2 or second satellite MNW 302-2," description of example message exchanges and other operations in the flow 500 will explicitly refer only to the FIG. 3 first satellite MNW 302-1 and second satellite MNW 302-2. The description can be referenced to the FIG. 2 system 200 by substituting "first satellite MNW 202-1" for "first satellite MNW 302-1," and substituting "second satellite MNW 202-2" for "second satellite MNW 302-2."

Referring to FIG. 5A, description of an example instance of the flow 500A will assume the REMT 210 is home registered on the first satellite MNW 302-1. The description will therefore alternatively refer to the first satellite MNW 302-1 as "home network" 302-1, and to the second satellite MNW 302-2 as "visitor network" 302-2.

An instance of the flow 500A can start by REMT 210 sending from location LC2 a CDR 502 to the RCS 206-1 of home network 302-1. The CDR 502 can be sent, for example, by the REMT 210 detecting, while at location LC2, an exit from home network 302-1. The CDR 502 can carry the REMT ID of the REMT 210, the HNW ID of the home network 302-1, and the VNW ID of the visitor network 302-2. Home network RCS 206-1 actions 504 in response can include identifying, e.g., by look-up, the HSP of the requestor REMT 210. Home network RCS 206-1 actions 504 can also include generating and sending an inter-network CDReq 506 to the visitor network RCS 206-2.

The inter-network CDReq 506 can carry, for example, the HNW ID, the MT ID, and HSP ID of the REMT 210 home service plan, and the VNW ID of visitor network 302-2. The visitor network RCS 206-2 operations 508 in response to receiving the inter-network CDR 506 can include applying HNW ID and HSP ID from the 506 content of the received inter-network CDR 506 to the second network mapping 208-2, which can be configured as the Table 2 mapping described above. Visitor network RCS 206-2 operations 508 can also include generating, after obtaining a second network visitor service plan from the mapping 208-2, and transmitting an inter-network CDRsp 510 to the home network RCS 206-1. Home network RCS 206-1, in response, can forward at 512 the inter-network CDRsp 510 to the REMT 210. As described above, information carried by the inter-network CDRsp 510 regarding the mapped-to second network 302-2 visitor service plan can be carried, for example, as a .zip file by the inter-network CDRsp 510. Not explicitly shown in FIG. 5A, the requestor REMT 210, upon receiving the .zip file, can configure itself to enter the visitor network 302-2 and, without interruption, receive according to the mapped-to second network 302-2 visitor service plan.

The flow 500A as visible in FIG. 5A can be readily adapted to show a process for configuring a REMT (not explicitly visible in FIG. 5A) home registered in the second satellite MNW 302-2 to roam into the first satellite MNW 302-1 and therein receive service according a first network 302-1 visitor service plan to which the second network HSP of the REMT maps. One example of such adaptation of the FIG. 5A sequence diagram 500A can include the following re-arrangement: replace block 210 with a block representing the second network REMT, interchange the positions of blocks 206-1 and 206-2, re-label the repositioned block 206-2 as "$2^{nd}$ Network RCS, Home Network," and re-label the repositioned block 206-1 as "$1^{st}$ Network RCS, Visitor Network."

The above description of the flow 500A assumes that the REMT 210 home registered on the first satellite MNW 302-1 received the configuration data for entering the second satellite MNW 302-2 prior to physically entering the 302-2 spotbeam. The FIG. 5A flow 500A was described with the REMT 210 being home registered on the first satellite MNW 302-1, and configuring REMT 210 to roam into the second satellite MNW 202-2 and therein receive network 202-2 service, prior to the REM physically exiting the coverage area of the first satellite MNW 202-1.

Figure 5B:
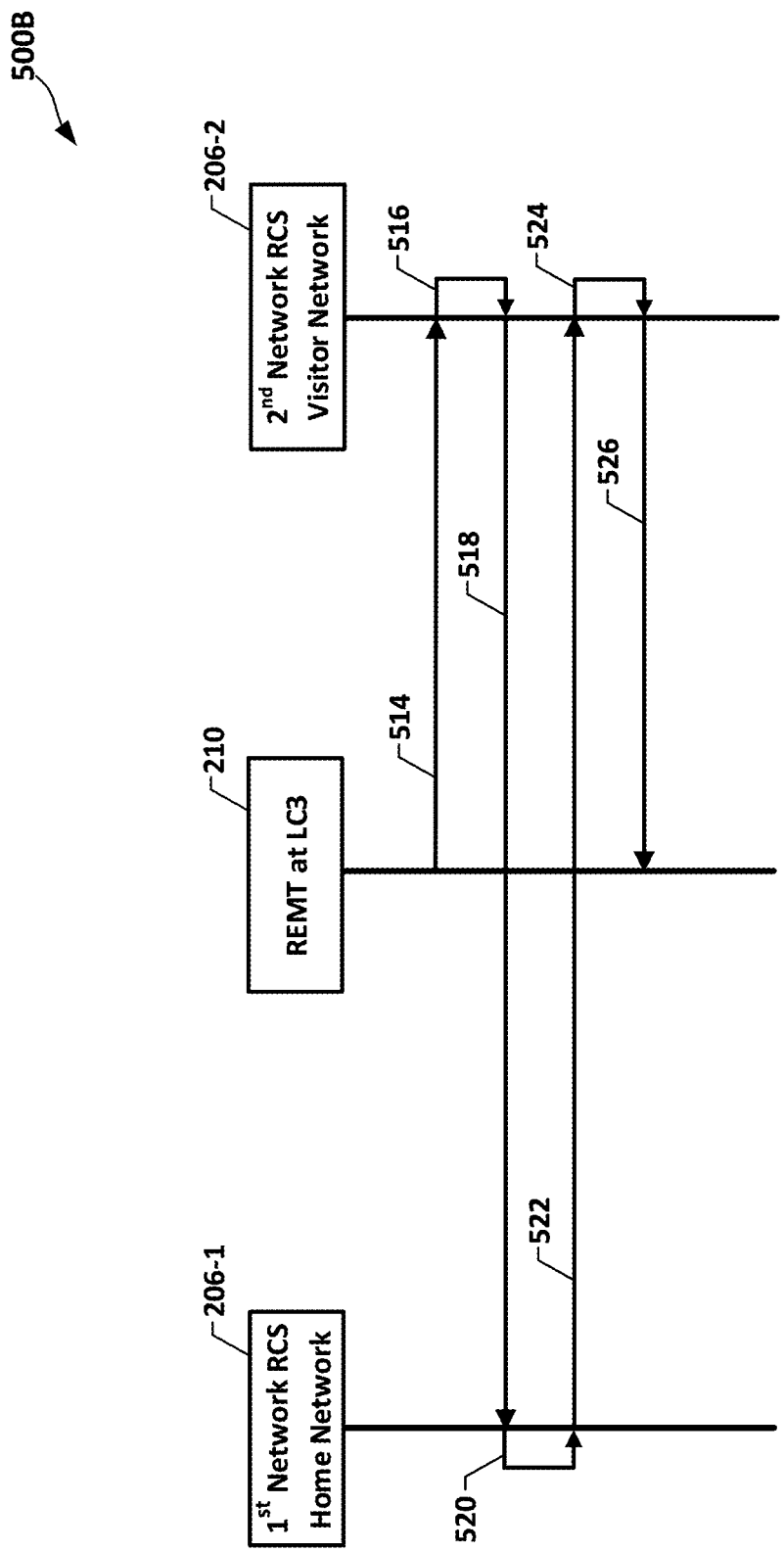
FIG. 5B is a sequence diagram of an adaptation of the FIG. 5A diagram that can be applied in instances where the REMT does not receive, prior to entry into the other of the two the configuration data for receiving service.

FIG. 5B is a sequence diagram of a backup or alternative flow 500B for configuring the REMT 210 after it has already left its home MNW and entered the visitor network.

An instance of the flow 50B will be described assuming the FIG. 3 REMT 210 is home registered on the first MNW 302-1, but has moved from location LC2 to location LC3 without receiving the configuration data. An instance of the flow 500B can start with the REMT 210 sending, e.g., from location LC3, configuration request 514 to the visited network's RCS, i.e., to the RCS 306-2 of the second MNW 302-2. The visited network's RCS 306-2, in response, generates at 516 a verification request and, sends the verification request 518 to the RCS of the REMT's home MNW, i.e., to the RCS 306-1 of MNW 302-1. The RCS 306-1, upon receiving the verification request 518 checks the validity of the REMT. If the validity does not check the flow can, for example, send a negative response (not explicitly visible in FIG. 5B) to the visited network's RCS 306-2. If the validity does check, operations at 520 can proceed to look up or retrieve an identifier for the REMT 210's HSP and then generate and transmit to the visited network's RCS 306-2 a verification response 522. The verification response can include the HSP ID of the REMT 210's HSP. Upon receiving the verification response 522, the RCS 306-2 of the second MNW 302-2 can apply at 524 the REMT 210 HSP to the visited network's service plan mapping 208-2. The RCS 306-2 can then send to the REMT 210 a configuration data 526 for receiving a second MNW service according to the second MNW visitor service plan to which the REMT 210's HSP maps.

Additional features and benefits of systems and methods of HSP roaming multi-network systems and methods can include substantial increase in flexibility and seamlessness for mobile terminals to move through multiple satellite MNWs. This in turn can enable significantly higher utilization of virtual network operators (VNOs).

Figure 6:
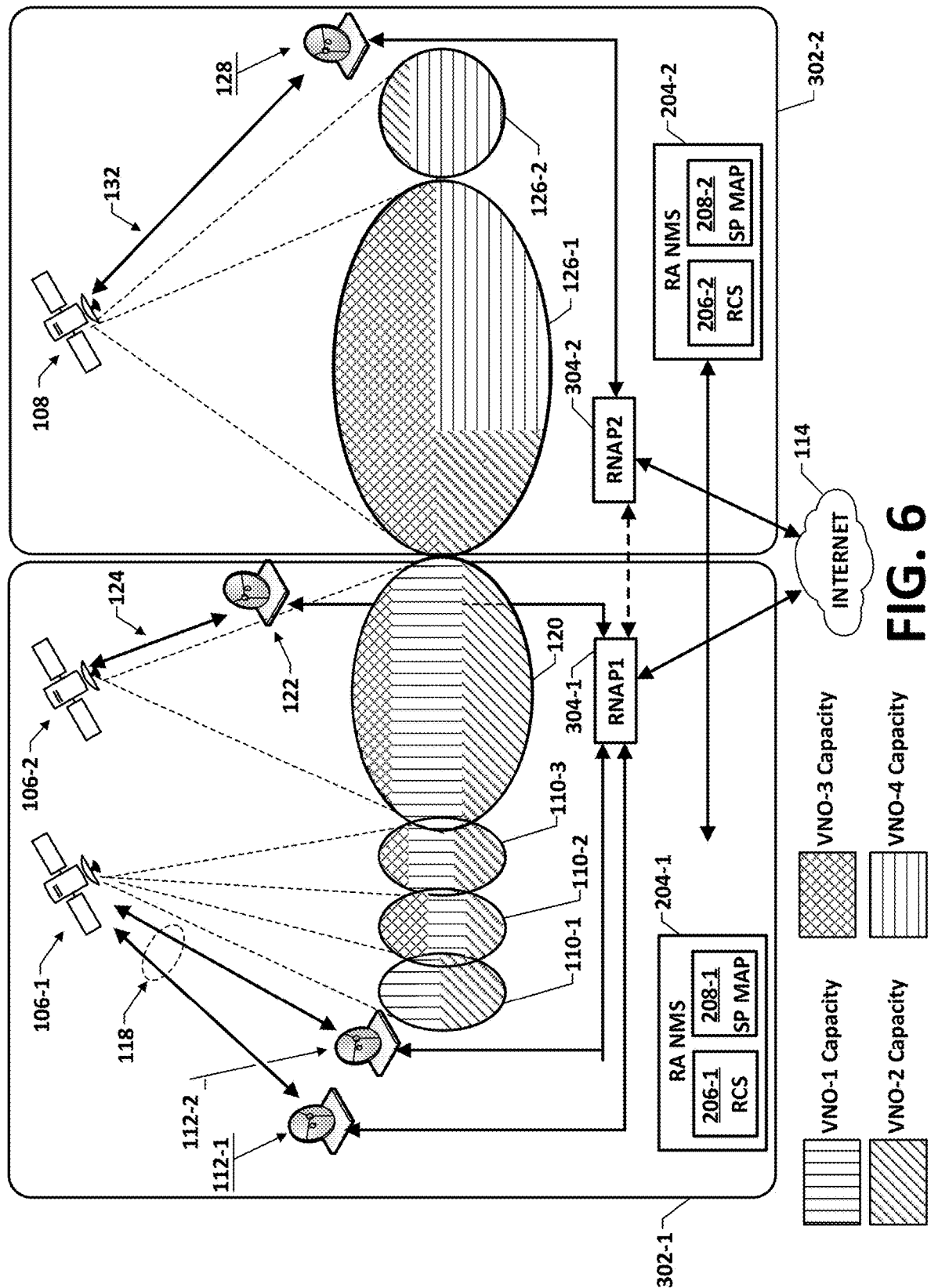
FIG. 6 shows, by graphic fill in accordance with the figure's visible legend, example bandwidth capacities of the FIG. 2 and FIG. 3 spotbeams for carrying different virtual network operators (VNOs).

FIG. 6 shows, by graphic fill in accordance with the figure's visible legend, example bandwidth capacities of the FIG. 2 and FIG. 3 spotbeams for carrying different VNOs. For brevity description will reference FIGS. 3 and 6, and can also be readily applied to FIGS. 2 and 6. The first satellite MNW 302-1 is shown as managed by first NMS/RML 204-1, and the second satellite MNW 302-2 is shown as managed by second NMS/RML 204-2. The example first satellite MNW 302-1 is shown having 2 satellites and the example second satellite MNW 302-2 is shown having one satellite. The first network first satellite 106-2 is shown having 3 beams 110-1, 110-2, and 110-3. The beams 110-1 and 110-2 are shown served by first network first gateway 112-1. The beam 110-3 is shown served by the second network first gateway 112-2. The first network second satellite 106-2 is shown providing one beam 120, which is served by first network third gateway 122. The second satellite MNW 202-2 satellite 108 is shown providing 2 beams, 126-1 and 126-2, served by second satellite MNW gateway 128. FIG. 6 shows the first satellite MNW 302-1 having bandwidth capacity for VNO-1 and VNO-2 in all 4 beams and capacity of VNO-3 in 3 beams, as per the FIG. 6 legend. As can be seen, the REMTs can get home or visitor roaming service in any beam in which the VNO to which the REMT belongs has a bandwidth subscription. For example, a terminal belonging to VNO-1 could get service in 110-1, 110-2, 110-3 and 120, but not as a visitor to 126-1 and 126-2, whereas a terminal that belongs to VNO-2 could get service in 110-1, 110-2, 110-3, 120, and as a visitor in 126-1 and 126-2.

Figure 7:
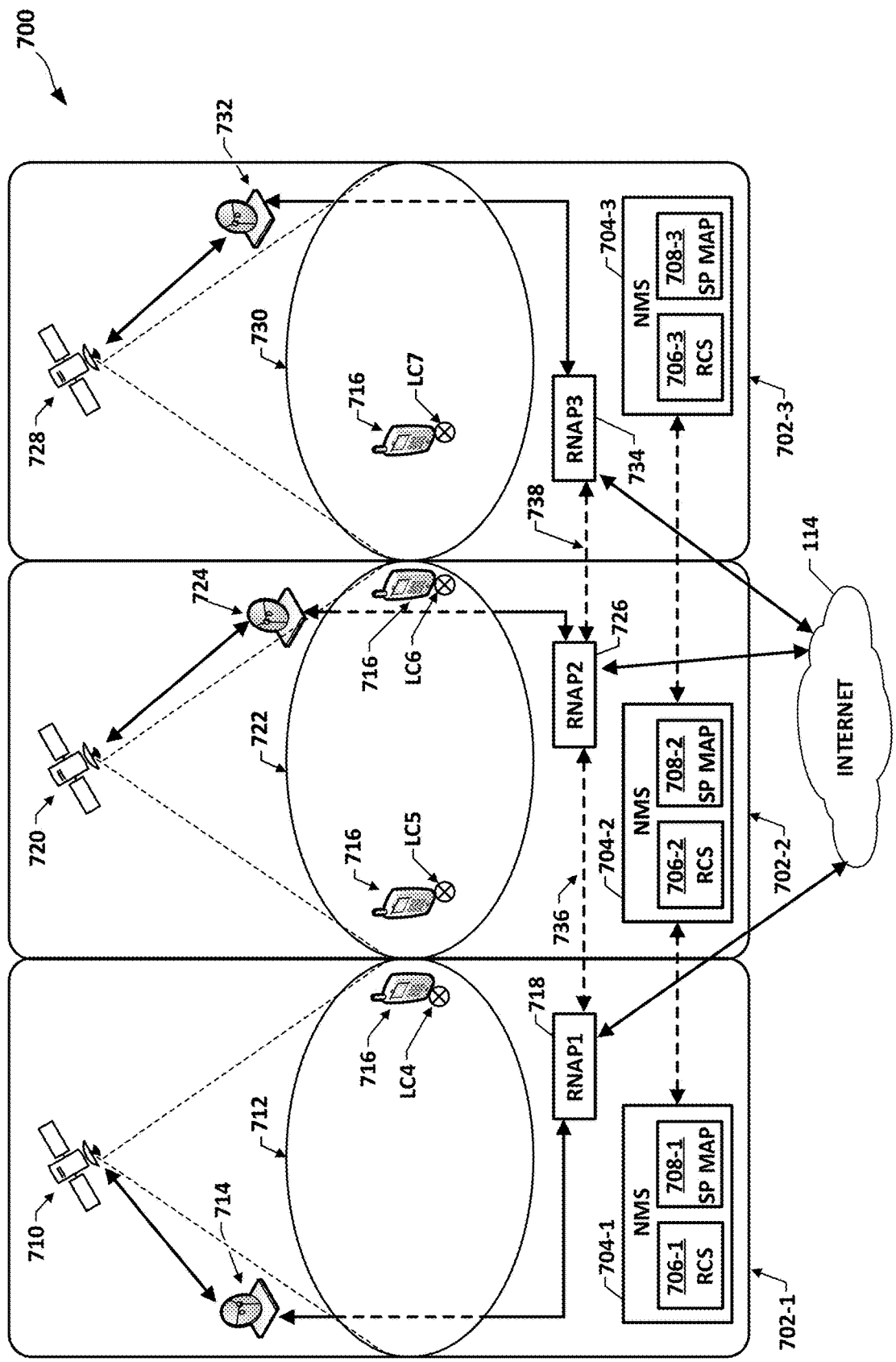
FIG. 7 is a functional block diagram of another example HSP roaming multiple MNW system including three MNWs, configured to provide REMT home registered on any of the three MNWs configuration data to enter another of the MNWs, and subsequent configuration data to roam between multiple other MNWs, and in each receive a visitor service plan to which the REMT's HSP maps.

FIG. 7 is a functional block diagram of a multi-network HSP roaming system 700 that includes three example satellite MNWs—a first satellite MNW 702-1, second satellite MNW 702-2, and third satellite MNW 702-3. The first satellite MNW 702-1 can be managed by a first network NMS/RML 704-1. The first network NMS/RML 704-1 can include or can be associated with a first network server 706-1 and a first network service plan mapping 708-1. The second satellite MNW 702-2 can be managed by a second network NMS/RML 704-2. The second network NMS/RML 704-2 can include or can be associated with a second network server 706-2 and a second network service plan mapping 708-2. The third satellite MNW 702-3 can be managed by a third network NMS/RML 704-3. The third network NMS/RML 704-3 can include or can be associated with a third network server 706-3 and a third network service plan mapping 708-3.

The first network service plan mapping 708-1 can include, or store, or otherwise access a mapping of different second satellite MNW 702-2 home service plans to corresponding first satellite MNW 702-1 service plans, and a mapping different third satellite MNW 702-3 home service plans to corresponding first satellite MNW 702-1 service plans. The second network service plan mapping 708-2 can be comparably configured, and can include storage or other access to a mapping of different first satellite MNW 702-1 home service plans to corresponding second satellite MNW 702-2 service plans, and a mapping of different third satellite MNW 702-3 home service plans to corresponding second satellite MNW 702-2 service plans. The third network service plan mapping 708-3, in a similar manner, can include storage or other access to a mapping of different first satellite MNW 702-1 home service plans to corresponding third satellite MNW 702-3 service plans, and a mapping different second satellite MNW 702-2 home service plans to corresponding third satellite MNW 702-3 service plans.

The first satellite MNW 702-1 can include a first satellite 710 configured to provide a first network spotbeam 712, and can include a first network gateway 714. The first network gateway 714 can connect via a feed link (visible but not separately numbered) to the first network satellite 710, which in turn can connect via service links (not separately visible in FIG. 7) to one or more REMTs within the first network spotbeam 712. An example REMT 716 and examples of different locations LC4, LC5, LC6, LC7 of same are visible and will be referenced later in this disclosure, in description of example roaming processes and operations thereof that can be provided the system 700.

The first satellite MNW 702-1 can include a first network route-back-to-home NAP 718, which is labelled on FIG. 7 and hereinafter referred to as "RNAP1" 718. An example implementation of the first network RNAP1 718 can provide, for Internet traffic to and from first satellite MNW 702-1 home registered REMTs in the first network spotbeam 712, a connection between the first network gateway 714 and the Internet 114. Example aspects and features of the first network RNAP1 718 with respect to visiting REMTs, e.g., home registered on the second satellite MNW 702-2 or third satellite MNW 702-3, are described in greater detail later.

To avoid obfuscation with description of details not necessarily particular to system 700 concepts, second satellite MNW 702-2 and third satellite MNW 702-3 are shown configured similar to first satellite MNW 702-1, with respect to the number of satellites and gateways, and spotbeam configuration. More specifically, second satellite MNW 702-2 is shown to include a second network satellite 720 providing a second network spotbeam 722, and with a second network gateway 724 that can connect via feed link(s) (visible but not separately numbered) to satellite 720 and through satellite 720 and service links (not visible in FIG. 7), to one or more REMTs located within the spotbeam 722. The second satellite MNW 702-2 can include a second network route-back-to-home NAP (hereinafter "second network RNAP2") 726. An example implementation of the second network RNAP2 726 can provide, for Internet traffic to and from REMTs home registered on second satellite MNW 702-2, a connection between the second network gateway 724 and the Internet 114. The third satellite MNW 702-3 is shown to include a third network satellite 728 providing a third network spotbeam 730, and to include a third network gateway 732. The third network gateway 732 can connect via feed link(s) (visible but not separately numbered) to satellite 728 and through satellite 728 and service links (not visible in FIG. 7), to one or more REMTs located within the spotbeam 730. The third satellite MNW 702-3 can include a third network RNAP3 734. An example implementation of the third network RNAP3 734 can provide, for Internet traffic to and from REMTs in the third network spotbeam 730 that are home registered on third satellite MNW 702-3, a connection between the third network gateway 732 and the Internet 114.

In an aspect, the first network RNAP1 718 can include a first network interface (visible in part in FIG. 7 but not separately numbered), an Internet interface (visible in FIG. 7 but not separately numbered), and a routing logic (not explicitly visible in FIG. 7). The first network interface can be configured to receive, e.g., via service links to the first network satellite 710, feed links to the first network gateway 714, and through the first network gateway 714, a first network home REMT traffic (not explicitly visible in FIG. 7) generated by one or more REMTs home registered on the first satellite MNW 702-1. The first network RNAP1 718 first network interface can be configured to also receive a first network first visitor traffic (not visible in FIG. 7) generated by one or more first visitor REMTs home registered on the second satellite MNW 702-2, or a first network second visitor traffic (not visible in FIG. 7) generated by one or more second visitor REMTs home registered on the third satellite MNW 702-2, or both a first network first visitor traffic and first network second visitor traffic. The routing logic of the first network RNAP1 718 can be configured to send the first network home REMT traffic, based at least in part on being generated by REMTs home registered on the first satellite MNW 702-1, directly to the Internet 114 for routing to the traffic's one or more Internet destinations. The first network RNAP1 718 can be further configured to send the first network first visitor traffic, based at least in part on being generated by visitor REMTs home registered on the second satellite MNW 702-2, over a route-back channel 736 to the second network RNAP2 726. The first network RNAP1 718 can also be configured to send first network second visitor traffic, based at least in part on being generated by visitor REMTs home registered on the second satellite MNW 702-2, over a another route-back channel (not fully visible in FIG. 7) to the third network RNAP3 734.

In an aspect, the routing logic of the first network RNAP1 718 can be selectively configured to provide the same direct to Internet 114 connection for first network first visitor traffic or the first network second visitor traffic, or both, as provided for first network home traffic.

The second network RNAP2 726 can include a second network interface (visible in part in FIG. 7 but not separately numbered), another Internet interface (visible in FIG. 7 but not separately numbered), and another routing logic (not explicitly visible in FIG. 7). The second network interface can receive, e.g., via spot beam 722 service links to the first network satellite 710, feed links to the second network gateway 724, and through the first network gateway 724, a second network home REMT traffic (not explicitly visible in FIG. 7) generated by one or more REMTs home registered on the second satellite MNW 702-2. The second network RNAP2 726 second network interface can receive a second network first visitor traffic (not visible in FIG. 7) generated by one or more first visitor REMTs home registered on the first satellite MNW 702-1, or a second network second visitor traffic (not visible in FIG. 7) generated by one or more second visitor REMTs home registered on the third satellite MNW 702-3, or both. The second network RNAP2 726 can be configured to send the second network home REMT traffic, based at least in part on its generation by REMTs home registered on the second satellite MNW 702-2, directly to the Internet 114. The second network RNAP 726 can be further configured to send the second network first visitor traffic, over the route-back channel 736 to the first network RNAP1 718 and to send the second network second visitor traffic over a route-back channel 738 to the third network RNAP3 734.

In an aspect, the routing logic of the second network RNAP2 726 can be selectively configured to provide the same direct to Internet 114 connection for second network first visitor traffic or second network second visitor traffic, or both, as provided for second network home traffic.

The third network RNAP3 734 can include a third network interface (visible in part in FIG. 7 but not separately numbered), another Internet interface (visible in FIG. 7 but not separately numbered), and another routing logic (not explicitly visible in FIG. 7). The third network interface can receive, e.g., via spot beam 730 service links to the third network satellite 728, feed links to the third network gateway 732, and through the third network gateway 732, a third network home REMT traffic (not explicitly visible in FIG. 7) generated by one or more REMTs home registered on the third satellite MNW 702-3. The third network RNAP3 734 third network interface also can receive a third network first visitor traffic (not visible in FIG. 7) generated by one or more third network first visitor REMTs home registered on the first satellite MNW 702-1, or a third network second visitor traffic (not visible in FIG. 7) generated by one or more second visitor REMTs home registered on the third satellite MNW 702-3, or both. The second network RNAP2 726 can be configured to send the third network home REMT traffic, based at least in part on its generation by REMTs home registered on the third satellite MNW 702-3, directly to the Internet 114. The third network RNAP3 734 can be further configured to send the third network first visitor traffic, over the route-back channel (not fully visible in FIG. 7) to the first network RNAP1 718 and to send the third network second visitor traffic over the route-back channel 738 to the second network RNAP2 726.

The first network RNAP1 716, second network RNAP2 726, and third network RNAP3 734 can be respectively configured to distinguish between their respective home registered REMTs and the visitor REMTs based, for example, on a current registration log (not explicitly visible in FIG. 7)

An arbitrary example of service plans that can be available from the first satellite MNW 702-1 can include "Network1-Plan1," "Network1-Plan2," and "Network1-Plan3." An arbitrary example of service plans available from the second satellite MNW 702-2 can include "Network2-Plan1," "Network2-Plan2," and "Network2-Plan3," and an arbitrary example of service plans available from the third satellite MNW 702-3 can include "Network3-Plan1" and "Network3-Plan2."

Assuming the above example service plans available from the first satellite MNW 702-1, second satellite MNW 702-2, and third satellite MNW 702-3, an implementation of the first network service plan mapping 708-1 can map each of the second satellite MNW 702-2 service plans, i.e., Network2-Plan1, Network2-Plan2, and Network2-Plan3 to a corresponding visitor service plan among Network1-Plan1, Network1-Plan2, and Network 2 default, and can also map each of the third satellite MNW 702-3 service plans Network3-Plan1 and Network3-Plan2 to a corresponding visitor service plan among the first satellite MNW 702-1 Network1-Plan1, Network1-Plan2, and Network1-Plan3.

One example of a particular configuration of the first network service plan mapping 708-1 can be in accordance with the following Table 3.

TABLE 3

Service Plan Mapping on Network1 as a Visitor Network
For Network2 Home Service Plans and Network 3 Home Service Plans

| | Home Network | Home Service Plan | Visitor Service Plan (at Network1) |
|---|---|---|---|
| Row 1 | Network2 | Network2-Plan1 | Network1-Plan1 |
| Row 2 | | Network2-Plan2 | Network1-Plan1 |
| Row 3 | | Network2-Plan3 | Network1-Plan2 |
| Row 5 | Network3 | Network3-Plan1 | Network1-Plan2 |
| Row 6 | | Network3-Plan2 | Network1-Plan3 |
| ... | | ... | |

Using the above example service plans available from the first satellite MNW 702-1, second satellite MNW 702-2, and third satellite MNW 702-3, an implementation of the second network service plan mapping 708-2 can map each of the first satellite MNW 702-1 Network2-Plan1, Network2-Plan2, and Network2-SPlan3, and each of the third network 702-3 service plans Network3-Plan1 and Network3-Plan1 to a corresponding visitor service plan among Network2-Plan1, Network2-Plan2, and Network2-Plan3.

One example of a particular configuration of the second network service plan mapping 708-2 can be in accordance with the following mapping Table 4.

TABLE 4

Service Plan Mapping on Network2 as a Visitor Network
For Network1 Home Service Plans and Network 3 Home Service Plans

| | Home Network | Home Service Plan | Visitor Service Plan (at Network2) |
|---|---|---|---|
| Row 1 | Network1 | Network1-Plan1 | Network2-Plan2 |
| Row 2 | | Network1-Plan2 | Network2-Plan1 |
| Row 3 | | Network1-Plan3 | Network2-Plan3 |
| Row 4 | Network3 | Network3-Plan1 | Network2-Plan2 |
| Row 5 | | Network3-Plan2 | Network2-Plan3 |
| ... | | ... | |

Using the above example service plans available from the first satellite MNW 702-1, second satellite MNW 702-2, and third satellite MNW 702-3, an implementation of the third satellite MNW service plan mapping 708-3 can map the example first satellite MNW 702-1 service plans, Network1-Plan1, Network1-Plan2, and Network1-Plan3, and map the example second satellite MNW 702-2 service plans, Network2-Plan1, Network2-Plan2, and Network2-Plan3, to a corresponding visitor service plan among Network3-Plan1 and Network3-Plan2.

One example of a particular configuration of the third network mapping 708-3 can be in accordance with the following mapping Table 5.

TABLE 5

Service Plan Mapping on Network3 as a Visitor Network
For Network1 Home Service Plans and Network 2 Home Service Plans

| | Home Network | Home Service Plan | Visitor Service Plan (at Network3) |
|---|---|---|---|
| Row 1 | Network1 | Network1-Plan1 | Network3-Plan1 |
| Row 2 | | Network1-Plan2 | Network3-Plan2 |
| Row 3 | | Network1-Plan3 | Network3-Plan2 |
| Row 4 | Network2 | Network2-Plan1 | Network3-Plan2 |
| Row 5 | | Network2-Plan2 | Network3-Plan1 |
| Row 8 | | Network2-Plan3 | Network3-Plan1 |
| | ... | ... | |

Figure 8A:
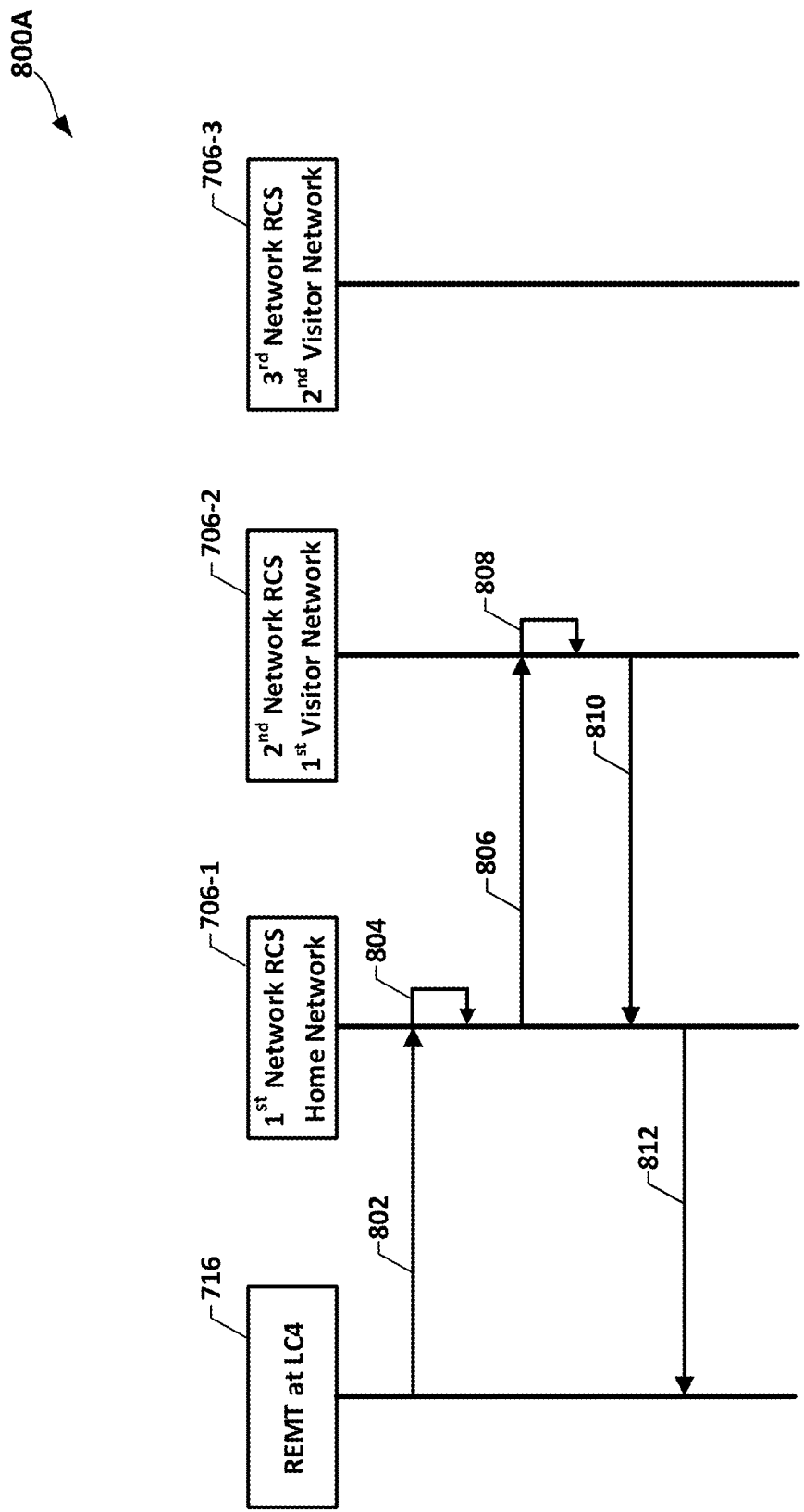
FIG. 8A is a sequence diagram of example message exchanges in processes of configuring a REMT home registered on one of the three FIG. 7 MNWs to enter a first of the other MNWs and receive therein a first network VSP to which the REMT's HSP maps.
Figure 8B:
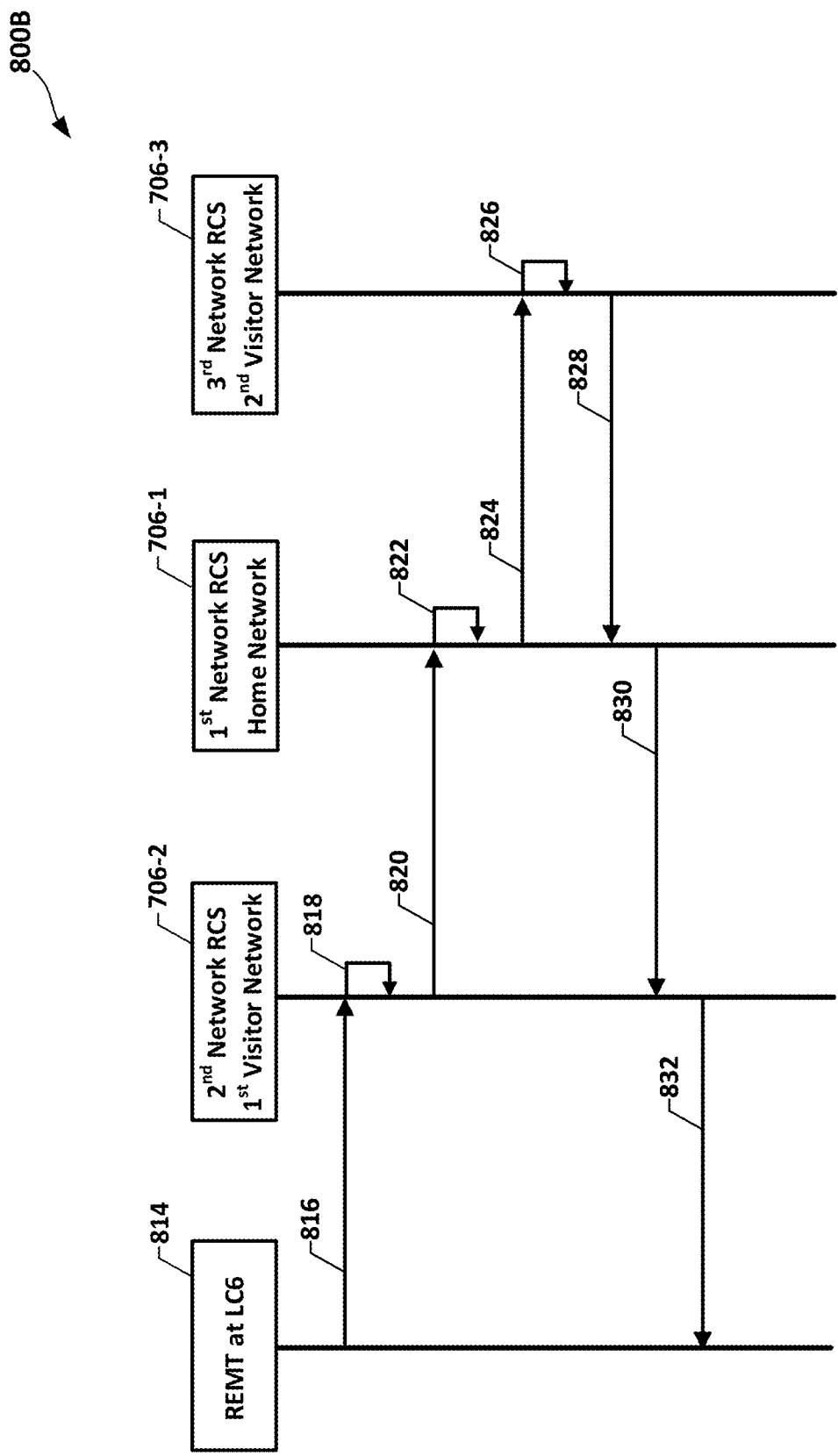
FIG. 8B is a sequence diagram of example message exchanges in processes of configuring the REMT to roam to a second of the other MNWs and therein receive a second network VSP to which the REMT's HSP maps.

FIG. 8A shows a sequence diagram of message exchanges in a process 800A for configuring the FIG. 7 REMT 716 to roam from LC4 in the first satellite MNW 702-1, into the second satellite MNW 702-2, and therein, e.g., at LC5, receive a second satellite MNW 702-2 service to which the REMT 716 first (home) network service plan maps. FIG. 8B shows a sequence diagram 800B of message exchanges in a process 800B for configuring the FIG. 7 REMT 716, when in the second satellite MNW 702-2 to roam, for example, from LC6 into the third satellite MNW 702-3, and therein receive, e.g., at LC7, a third satellite MNW 702-3 service to which the REMT 716 first (home) network service plan maps. For purposes of description the first satellite MNW 702-1 will be referenced as the "home network" 702-1, the second satellite MNW 702-2 as the "first visitor network" 702-2, and the third satellite MNW 702-3 as the "second visitor network" 702-3. It will be assumed Network1-Plan2 is the home network HSP of REMT 716.

An instance of the flow 800A can start with the REMT 716 sending, for example, from location LC4, a CDR 802 to the home network RCS 706-1. The REMT 716 may send the CDR 802, for example, in response to detecting a particular motion of REMT 716 at location LC4, indicating exit from the home network spotbeam 712 into the first visitor network spotbeam 722. The CDR 802 can include the MT ID of the requestor REMT 716, the HNW ID of home network 702-1 and the VNW ID of the first visitor network 702-2. Upon receiving the CDR 802, home network RCS 706-1 operations 804 can obtain the first network 702-1 HSP for the requestor REMT 716. Operations 804 can then generate and send an inter-network CDReq 806 to the first visitor network RCS 706-2. The inter-network CDReq 806 can also be referred to as "a first network to second network" inter-network CDReq 806. Since Network1-Plan2 is assumed as the HSP for the requestor REMT 716, the inter-network CDReq 806 can include the HSP ID of Network1-Plan2, in addition to the HNW ID of home network 702-1, VNW ID of the first visitor network 702-2, and the MT ID of REMT 716.

Upon receiving the inter-network CDReq 806, first visitor network RCS 706-2 operations 808 can include applying the HNW ID and HSP ID from the received inter-network CDR 806 to the first visitor network service plan mapping 708-2. For this example, Table 4 is assumed as the first visitor network service plan mapping 708-2, and Network1-Plan2, the HSP for the requestor REMT 716, appears in Table 4, Row 2. As shown by Table 4, the first visitor network service plan mapping 708-1 output is Network2-Plan1. First visitor network RCS 706-2 operations 808 can therefore configure and send inter-network CDRsp 810 to include a configuration data for Network2-Plan1. The inter-network CDRsp 810 can be referred to as a "first visitor network to home network" inter-network CDRsp 810. The home network RCS 706-2 can respond to inter-network CDRsp 810 by a forwarding 812 to the REMT 716. The inter-network CDRsp 810 and the forwarding 812 can carry the configuration data for Network2-Plan1, for example, as a .zip file.

Not explicitly shown in FIG. 8A, the requestor REMT 716, upon receiving the .zip file, can configure itself to enter the first visitor network 702-2 and, without interruption, receive according to the corresponding mapped-to second network 702-2 service plan.

It will be assumed that the REMT 716, after entering the first visitor network 702-2, has moved within and across the second network spotbeam area 722, from location LC5 to LC6. FIG. 8B block 814 represents the REMT 716 at LC6. Referring to FIG. 7, location LC6 is close to the outer perimeter of spotbeam 722 and near the outer perimeter of the third network spotbeam 730.

It will be assumed that the REMT 716 at location LC6 detects exit from the first visitor network 702-2 and entry into the second visitor network 702-3. The detection can be based, for example, on the location LC6 and movement of the REMT 716. The REMT 716, in response, can send another CDR 816. First visitor network RCS 706-2 operations 818 in response to receipt of the CDR 816 can include determining REMT 716 is a visitor REMT and not a second network registered REMT. The determining can be based, for example, on the REMTs HNW ID included in the REMT's generated CDRs. Upon determining the requestor REMT 716 is home registered in the first network 702-1, first visitor network RCS 706-2 operations 818 can send a home network directed inter-network CDReq 820 to the HSP RML 706-1 of the home network 702-1.

Referring to FIGS. 7 and 8B, home network RCS 706-1 operations 822 in response to the home network directed inter-network CDR 820 can include looking up the HSP of the requestor REMT 716, and transmitting inter-network CDReq 824 to the third network RCS 706-3 of second visitor network 702-3. The inter-network CDReq 824 communication to the third network RCS 706-3 of second visitor network 702-3 can also be referred to as a "home network to second visitor network" inter-network CDReq 824. The inter-network CDReq 824 can include the MT ID, HNW ID, the VNW ID of the second visitor network 702-3, and the HSP ID of requestor REMT 716. The HSP ID can be generated, for example, by the operations 822 the looking up the HSP.

Upon receipt of the home network to second visitor network inter-network CDReq 824, second visitor network RCS 706-3 operations 826 can apply the HNW ID and HSP ID from the received CDReq 824 to the second visitor network service plan mapping 708-3. In this example the second visitor network service plan mapping 708-3 is configured according to Table 5. Assuming Network1-Plan2 is the HSP for the requestor REMT 716, the mapping entry is Table 5, Row 2. The mapping output is therefore Network3-Plan2. Operations 826 can then generate the second visitor network configuration data, and send to the home network RCS 706-1 inter-network CDRsp 828 carrying said data. The inter-network CDRsp 828 to FIG. 7 can also be referred to as a "second visitor network to home network" inter-network CDReq 828. The inter-network CDRsp 828 can carry the second visitor network configuration data obtained at 826, for example, as a .zip file. The home network RCS 706-1 can respond by a forwarding at 830 of the inter-network CDRsp 828 to the first visitor network RCS 706-2. The first visitor network RCS 706-2 can, in turn, forward at 832 to REMT 716 the second visitor network configuration data obtained at 826.

Not explicitly shown in FIG. 8B, the requestor REMT 716, upon receipt of the forward 832 of the .zip file, can configure itself to enter the second visitor network 702-3, and without interruption receive, e.g., at location LC7, service according to the mapped-to second visitor network 702-3 service plan.

In various implementations, the above-described system 200, system 300, and system 700 can be further configured to store a record of configurations and configuration data, for example, for specific REMTs, of satellite MNWs the REMT has visited. Additional features and benefits can include, but are not limited to, speed of switching and bandwidth efficiency.

Implementations can feature secure communication between NMSes of different networks, and can include a secure authentication mechanism between terminals and the NMSes. This feature can provide, among other features and benefits, avoidance of the requirement to load keys or terminal specific configuration data for a terminal in a visitor network. This can also provide fast inter-network handover, by avoiding the need for the terminal to download configuration after entry into the visitor network. Keys used can be, for example, and without limitation, Q or more bits. An example Q can be 256.

Implementations can provide a mobile terminal with service in partner networks that can have respective agreements with the terminal's home network. Benefits provided to the mobile terminal can thereby include, without limitation, minimization of disruption time at the time of network switch. Further benefits can include, but are not limited to, providing network operators an ability to lease bandwidth and other resources to a partner network such that terminals from that partner network can get service in a visitor network.

Implementation can include critical configuration messages, which can be signed, for example by using cryptographically strong encryption algorithms and keys. Such algorithms and keys can provide, among other features and benefits, prevention or at least strong resistance to man-in-the-middle, denial of service, replay or other modes of attack.

In an implementation, mobile terminals, or at least mobile terminals subscribing to a roaming service, can be sent a network specific roaming key generated using a secure key, and certain other parameters.

In an implementation, each of the multiple networks that that are part of the roaming system can include a logic configured to generate, for each REMT that is home registered on that network, an encrypted key. For example, referring to FIG. 3, first satellite MNW 302-1 and second satellite MNW 302-2 can each include such logic. The logic can be, for example, a processing resource of the MNW's RCS. The encrypted key will be referred to, for purposes of description, as an "effective roaming master key." Each MNW can generate an effective roaming master key for each of its home register REMTs using a network roaming key, which is unique to the MNW, and a key ID unique to the REMT. The unencrypted network roaming key is not provided to any other MNW. For the effective roaming master key to be effective, both the REMT and the MNW on which the REMT is home registered use the same key. Only the home MNW can send the effective roaming master key to the REMT. Other MNWs cannot change the effective roaming key for visiting REMTs. In an aspect, for each REMT, its home MNW can change the effective key at will. If a home MNW has multiple partner visitor MNWs, there is a separate network roaming key for each visitor network.

An example effective master key can be Q bits. One example Q can be, but is not limited to, 256 bits. The example value of Q is only for purposes of illustration, as it can be larger than 256 and, if a lower security is acceptable, Q can be less than 256.

FIG. 9 shows a diagram of an example logic 900 for generating an effective roaming master key. The logic 900 can be configured to receive the MNW's network roaming key, unique to the MNW, can receive a key ID, and a key version. The key ID can be unique to the REMT. The key version can be incremented, for example, when replacing a key ID, e.g., due to compromise. The logic 900 can be configured to generate the effective roaming master key based, at least in part, on applying a hashing algorithm to the network roaming key, and key ID. One example hashing algorithm can be SHA2 (Secure Hash Algorithm 2), which is shown by the FIG. 9 visible label. It will be understood that SHA2 is only one example hashing algorithm for which logic 900 can be configured, and is not intended as a limitation or as a statement of preference as to implementation of logic 900 or regarding the scope of practices in accordance with this disclosure and its appended claims.

Referring to FIGS. 3 and 9, one example implementation can include, in association with the first network, e.g., first MNW 302-1, a first roaming key generation logic (not separately visible in FIG. 3) that can implement a first network instance of the logic 900. The first roaming key generation logic can be provided, for example, by processing and memory resources of the first network RCS 206-1. The first network roaming key generation logic can be configured to generate a first network effective roaming master key for a first mobile terminal, e.g., a first REMT (not separately visible in FIG. 3), home registered on the first network, e.g., on the first MNW 302-1. The first network roaming key generation logic can be configured to send the first network effective roaming master key to the second network, e.g., to the RCS 206-2 of the second MNW 302-2 for delivery to the above-identified first mobile terminal when visiting in the second MNW 302-2. The first network roaming key generation logic can be configured to generate the first network effective roaming master key as an encrypted key, based at least in part on a hash, e.g., SHA2, of a first network roaming master key and a first key ID.

The above-referenced example implementation can also include, in association with the second network, e.g., second MNW 302-2, a second network roaming key generation logic (not separately visible in FIG. 3) that can implement another, or second network instance of the logic 900. The second network roaming key generation logic can be provided, for example, by processing and memory resources of the second network RCS 206-2. The second network roaming key generation logic can be configured to generate a second network effective roaming master key for a second mobile terminal, e.g., a second REMT (not separately visible in FIG. 3), home registered on the second network, e.g., on the second MNW 302-2. The second network roaming key generation logic can be configured to send the second network effective roaming master key to the first network, e.g., to the RCS 206-1 of the first MNW 302-1 for delivery to the above-identified second mobile terminal when visiting in the first MNW 302-1. The second network roaming key generation logic can be configured to generate the second network effective roaming master key as another encrypted key, based at least in part on a hash, e.g., SHA2, of a second network roaming master key and a second key ID. key and a second key ID.

In an aspect, session keys to encrypt data traffic can be generated and owned by each MNW. In the home MNW, the session keys can be sent to the REMT encrypted using a terminal secret key. To avoid sharing terminal secret keys with visitor MNWs, an implementation can use the effective roaming master key to encrypt and send the session keys to the REMT. In another aspect, when an REMT is in a visitor MNW, the session keys are sent to the REMT only after the visitor MNW successfully confirms with the home MNW the validity of the REMT, and the REMT authenticates with the visitor MNW network using 3 way challenge response scheme. The challenge response scheme can be configured to use a randomly generated Commissioning Key and Effective Roaming Master Keys. In the REMTs, encrypted keys can be stored in a write-only memory, not accessible outside of hardware registers. In an aspect, encryption and decryption can be performed by a dedicated hardware.

FIG. 10A is a diagram of an example logic 1000A for generating a challenge, for an authenticating in accordance with the present disclosure. FIG. 10B is a diagram of an example logic 1000B for authenticating the challenge.

The logic 1000A generating of a challenge can apply an encryption algorithm, such as the AES (Advanced Encryption Standard) example visible in FIG. 10A, and can be performed when the REMT is provided with specific keys for the visitor network. The logic 1000B can apply a decryption algorithm in accordance with the encryption applied by the logic 1000B, e.g., AES. The logic 1000A and 1000B can also receive an initial value, and a key. The input, initial value, and key received by logic 900, as well as the logic 900 output, can be Q bits. It will be understood that AES is only one example encryption/decryption algorithm for which logic 1000A and 1000B can be configured, and is not intended as a limitation or as a statement of preference as to implementation of logic 1000A or 1000B, or regarding the scope of practices in accordance with this disclosure and its appended claims.

Referring to FIGS. 3, 10A and 10B, one example implementation can include, in association with the first network, e.g., first MNW 302-1, a first network visitor mobile terminal verification logic, implemented as a first network instance of the FIG. 10A logic 1000A and of the FIG. 10B logic 1000B. The first network visitor mobile terminal verification logic can be configured to verify the second mobile terminal, based at least in part on a 3 way challenge response scheme, such as described above in reference to FIGS. 10A and 10B. The example implementation can also include, in association with the second network, e.g., second MNW 302-2, a second network visitor mobile terminal verification logic, implemented as a second network instance of the FIG. 10A logic 1000A and of the FIG. 10B logic 1000B. The second network visitor mobile terminal verification logic can be configured to verify the first mobile terminal, based at least in part on a 3 way challenge response scheme, such as described above in reference to FIGS. 10A and 10B. The first network visitor mobile terminal verification logic can be provided, for example, by processing and memory resources of the first network RCS 206-1, and the second network visitor mobile terminal verification logic can be provided, for example, by processing and memory resources of the second network RCS 206-2.

FIG. 11 shows a logic 1100 for generating a function key, for example, for receiving functions in a visitor MNW. Using different derived keys for different functions allows security for each application and communication path. In an implementation, a key used to support a given function (e.g., FunctionX) can be generated using strong one way hashing algorithm.

Features and benefits provided by systems and methods according to this disclosure can include, without limitation:

providing mobile terminals using a satellite network with means to roam into and receive service in a different satellite network, regardless of the two satellite networks being operated and managed independently from one another.

providing service providers or network operators with means to lease bandwidth and resources in a different network, as a means to extend service area coverage.

providing configuration of mapping of service plans in a business partner visitor network, thus enabling mobile terminals to receive service in visitor network.

providing mobile terminal service in a business partner visitor network without having to share or disclose secret keys embedded in the terminal hardware.

providing support of mobile terminals to receive service in a business partner visitor network without having to create or configure anything on per terminal basis in the business partner visitor network.

Figure 12:
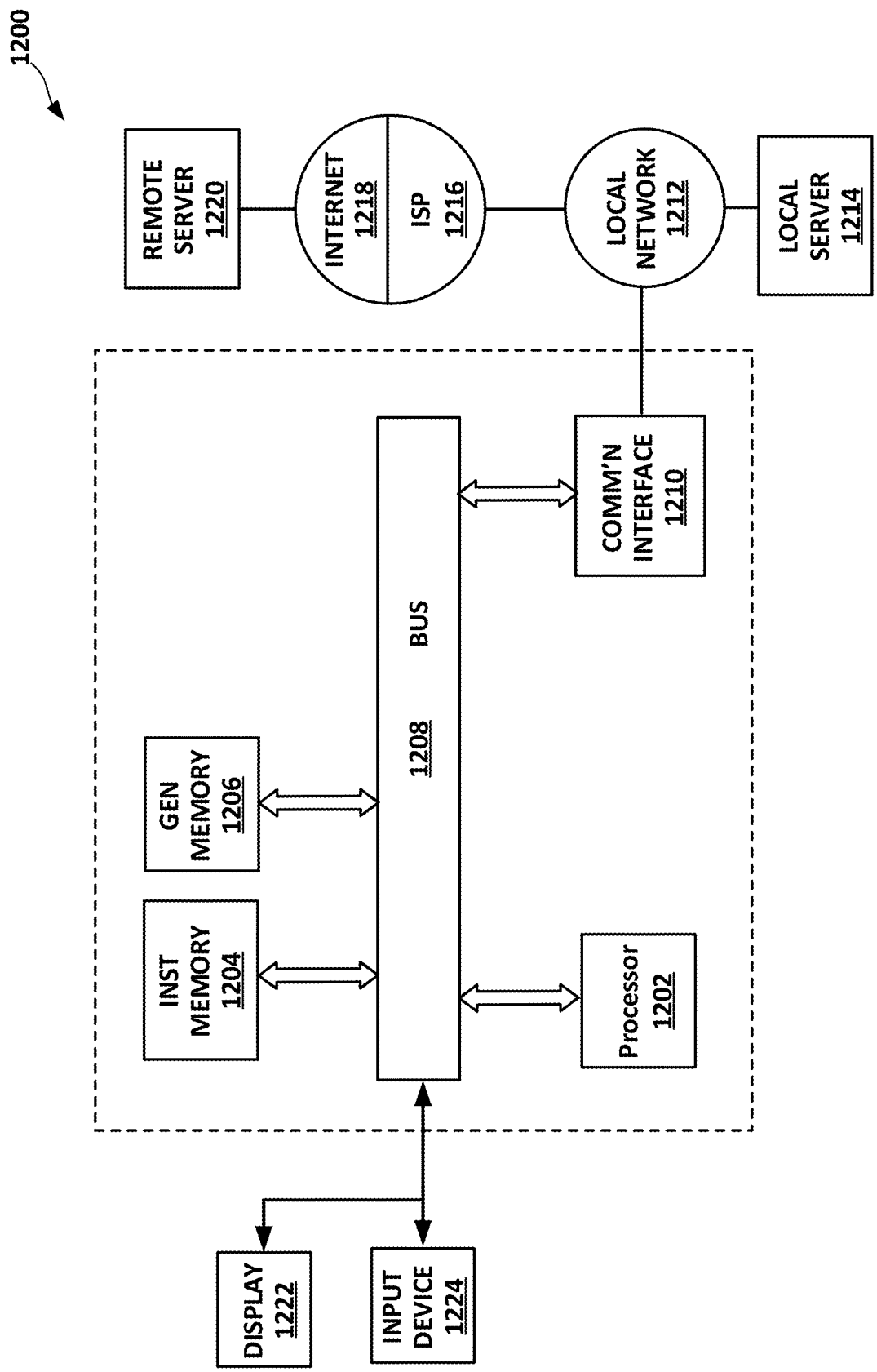
FIG. 12 shows a logic block diagram illustrating one example computer system upon which aspects of this disclosure may be implemented.

FIG. 12 shows a block diagram illustrating a computer system 1200 upon which aspects of this disclosure may be implemented, such as, but not limited to the processes described at FIGS. 5 and 8. It will be understood that functional blocks illustrated in FIG. 12 are logical blocks, and do not necessarily correspond to particular hardware on a one-to-one basis.

Referring to FIG. 12, the computer system 1200 can include a data processor 1202, a general, an instruction memory 1204, and a general memory 1206, coupled by a bus 1208. The computer system 1200 can also include a communications interface 1210 to interface with a local network 1212, which can interface a local server 1214 and, via an Internet Service Provider (ISP) 1216 can access the Internet 1218 to a remote server 1220. The computer system 1200 can include a display 1222 and an input device 1224. The instruction memory 1204 can include a tangible medium retrievably storing computer-readable instructions that when executed by the data processor 1202 cause the processor to perform operations and processes including, but not limited to, as described in reference to FIGS. 5, 8A, and 8B.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracing of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that terms and expressions used herein have the ordinary meaning accorded to such terms and expressions in their respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

In the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system for mobile terminal roaming, comprising:
a first network management logic associated with a first network;
a second network management logic associated with a second network, wherein the first network management logic is configured to:
receive a request for a second network configuration data, the request including an identifier of a mobile terminal;

identify a first network home service plan of the mobile terminal;

transmit to the second network management logic an inter-network configuration data request, which carries the request for the second network configuration data and an identifier of the first network home service plan of the mobile terminal;

receive from the second network management logic an inter-network configuration data response, corresponding to the inter-network configuration data request, which carries the second network configuration data and, in response, transmit the second network configuration data to the mobile terminal; and a network exit detection logic configured to detect the mobile terminal exiting a coverage area of the first network for entry into a coverage area of the second network and, in response, to generate and transmit the request for the second network configuration data.

2. A system according to claim 1, wherein the second network management logic is configured to:

receive the inter-network configuration data request and, in response, to:

identify a corresponding second network service plan, based at least in part on the identifier of the first network home service plan of the mobile terminal in combination with a service plan mapping of a plurality different first network home service plans to corresponding second network service plans, generate the inter-network configuration data response, in a configuration that carries the second network configuration data, the second network configuration data being based at least in part on the corresponding second network service plan, and transmit the inter-network configuration data response to the first network management logic.

3. A system according to claim 2, wherein the mobile terminal is a first mobile terminal, the first network is a home network of the first mobile terminal, the inter-network configuration data request is a first network to second network inter-network configuration data request, the inter-network configuration data response is a second network to first network inter-network configuration data response, and the second network is a home network of a second mobile terminal, wherein:

the second network management logic is further configured to:

receive a request for a first network configuration data, which carries an identifier of the second mobile terminal;

identify a second network home service plan of the second mobile terminal;

transmit to the first network management logic a second network to first network inter-network configuration data request, which carries the request for the first network configuration data, the identifier of the second mobile terminal, and an identifier of the second network home service plan of the second mobile terminal;

receive from the first network management logic a first network to second network inter-network configuration data response, which carries the first network configuration data; and transmit the first network configuration data to the second mobile terminal.

4. A system according to claim 3, wherein the first network management logic is further configured to:

receive the second network to first network inter-network configuration data request and, in response, to:

identify a corresponding first network service plan, based at least in part on the identifier of the second network home service plan of the second mobile terminal in combination with a service plan mapping of a plurality different second network home service plans to corresponding first network service plans, generate the first network to second network inter-network configuration data response, in a configuration that carries the first network configuration data, the first network configuration data being based at least in part on the corresponding first network service plan, and transmit the first network to second network inter-network configuration data response to the second network management logic.

5. A system according to claim 2, wherein:

the inter-network configuration data request is a first network to second network inter-network configuration data request, and the inter-network configuration data response is a second network to first network inter-network configuration data response, the system further comprises a third network management logic, which is associated with a third network, the first network management logic stores a registration that indicates the first network as home network of the mobile terminal, the second network management logic is further configured to receive from the mobile terminal a request for a third network configuration data, which carries the identifier of the mobile terminal and an identifier of the third network and, in response, to transmit to the first network management logic a home network directed inter-network configuration data request, which carries the request for the third network configuration data, and the first network management logic is further configured to receive the home network directed inter-network configuration data request and, in response, to:

transmit to the third network management logic a first network to third network inter-network configuration data request, which carries the identifier of the mobile terminal and the identifier of the first network home service plan of the mobile terminal, and receive, from the third network management logic, a third network to first network inter-network configuration data response, corresponding to the first network to third network inter-network configuration data request, and which carries the third network configuration data and the identifier of the mobile terminal and, in response, to transmit to the second network management logic a first network to second network inter-network forwarded inter-network configuration data response, which carries the third network configuration data and the identifier of the mobile terminal.

6. A system according to claim 5, wherein the second network management logic is further configured to receive from the first network management logic the first network to second network inter-network forwarded inter-network configuration data response and, in response, to transmit to the mobile terminal the third network configuration data carried by the first network to second network inter-network forwarded inter-network configuration data response.

7. A system according to claim 1, wherein:
the mobile terminal is a first mobile terminal,
the second network management logic is further configured to selectively switch a registration status of the first mobile terminal between unregistered on the second network and visitor registered on the second network, and to selectively set a registration status of the second terminal to home registered on the second network,
the system further includes a first network NAP (network access point), associated with the first network, and a second network NAP (network access point), associated with the second network, the second network NAP including a second network interface, an Internet interface, and a routing logic,
the second network interface is configured to receive a first traffic generated by the first mobile terminal when visitor registered on the second network,
the second network interface is further configured to receive a second traffic generated by the second mobile terminal when home registered on the second network, and
the routing logic is configured to:
send the first traffic, based at least in part on the first mobile terminal being visitor registered on the second network, over a route-back channel to the first network NAP, and
send the second traffic, based at least in part on the second mobile terminal being home registered on the second network, to the Internet for routing to at least one Internet destination.

8. A system according to claim 1, wherein the system further comprises:
in association with the first network, a first roaming key generation logic configured to generate a first network effective roaming master key for a first mobile terminal home registered on the first network, and to send the first network effective roaming master key to the second network for delivery to the first mobile terminal, wherein generating the first network effective roaming master key is encrypted based at least in part on a hash of a first network roaming master key and a first key ID; and
in association with the second network, a second roaming key generation logic configured to generate a second network effective roaming master key for a second mobile terminal home registered on the second network, and to send the second network effective roaming master key to the first network for delivery to the second mobile terminal, a wherein generating the second network effective roaming master key is encrypted based at least in part on a hash of a second network roaming master key and a second key ID.

9. A system according to claim 8, wherein the system further includes:
in association with the first network, a first network visitor mobile terminal verification logic, configured to verify the second mobile terminal, based at least in part on a 3 way challenge response scheme, and
in association with the second network, a second network visitor mobile terminal verification logic, configured to verify the first mobile terminal, based at least in part on another instance of the 3 way challenge response scheme.

10. A method for mobile terminal roaming, comprising:
receiving at a first network a request for a second network configuration data, the request including an identifier of a mobile terminal;
identifying a first network home service plan of the mobile terminal;
transmitting to the second network an inter-network configuration data request, which carries the request for the second network configuration and an identifier of the first network home service plan of the mobile terminal;
receiving from the second network an inter-network configuration data response, corresponding to the inter-network configuration data request, which carries the second network configuration data;
transmitting the second network configuration data to the mobile terminal;
detecting the mobile terminal exiting a coverage area of the first network for entry into a coverage area of the second network; and
generating and transmitting the request for the second network configuration data.

11. A method according to claim 10, wherein the method further comprises:
receiving at the second network the inter-network configuration data request and, in response to the inter-network configuration data,
identifying a corresponding second network service plan, based at least in part on an identifier of the first network home service plan of the mobile terminal in combination with a service plan mapping of a plurality different first network home service plans to corresponding second network service plans,
generating the inter-network configuration data response, in a configuration that carries the second network configuration data, the second network configuration data being based at least in part on the corresponding second network service plan, and
transmitting the inter-network configuration data response to the first network.

12. A method according to claim 11, wherein the mobile terminal is a first mobile terminal, the first network is a home network of the first mobile terminal, the inter-network configuration data request is a first network to second network inter-network configuration data request, the inter-network configuration data response is a second network to first network inter-network configuration data response, and the second network is a home network of a second mobile terminal, wherein the method further comprises:
receiving at the second network a request for a first network configuration data, which carries an identifier of the second mobile terminal;
identifying a second network home service plan of the second mobile terminal;
transmitting, to the first network, a second network to first network inter-network configuration data request, which carries the request for the first network configuration data, the identifier of the second mobile, and an identifier of the second network home service plan of the second mobile terminal;
receiving, from the first network, a first network to second network inter-network configuration data response, corresponding to the second network to first network inter-network configuration data request, and which carries the first network configuration data; and
transmitting the first network configuration data to the second mobile terminal.

13. A method according to claim 12, wherein the method further comprises:
  receiving at the first network the second network to first network inter-network configuration data request;
  identifying a corresponding first network service plan, based at least in part on the identifier of the second network home service plan of the second mobile terminal in combination with a service plan mapping of a plurality different second network home service plans to corresponding first network service plans,
  generating the first network to second network inter-network configuration data response, in a configuration carrying the first network configuration data, the first network configuration data being based at least in part on the corresponding first network service plan; and
  transmitting, to the first network, the first network to second network inter-network configuration data response.

14. A method according to claim 11, wherein the inter-network configuration data request is a first network to second network inter-network configuration data request, and the inter-network configuration data response is a second network to first network inter-network configuration data response, the first network is home network of the mobile terminal, and the method further comprises:
  receiving at the second network, from the mobile terminal, a request for a third network configuration data, which carries the identifier of the mobile terminal and an identifier of the third network and, in response, transmitting to the first network a home network directed inter-network configuration data request, which carries the request for the third network configuration data and the identifier of the third network;
  receiving at the first network the home network directed inter-network configuration data request and, in response, transmitting to the third network a first network to third network inter-network configuration data request, which carries the identifier of the mobile terminal and the identifier of the first network home service plan of the mobile terminal;
  receiving, at the first network, a third network to first network inter-network configuration data response, corresponding to the first network to third network inter-network configuration data request, and which carries the third network configuration data and the identifier of the mobile terminals; and
  transmitting to a second network management logic a first network to second network inter-network forwarded inter-network configuration data response, which carries the third network configuration data and the identifier of the mobile terminal.

15. A method according to claim 14, wherein the method further comprises:
  receiving, at the second network, the first network to second network inter-network forwarded inter-network configuration data response and, in response, transmitting to the mobile terminal the first network to second network inter-network forwarded inter-network configuration data response, which carries the third network configuration data.

16. A method according to claim 10, where the method further comprises:
  setting a registration status of the first terminal as being a visitor registered on the second network, and setting a registration status of the second terminal to be home registered on the second network;
  receiving a first traffic, on a second network NAP (network access point) associated with the second network, the first traffic being generated by the first terminal when visitor registered on the second network and, based at least in part on the first traffic being generated by the first terminal when visitor registered on the second network, sending the first traffic over a route-back channel to which a first network NAP associated with the first network second traffic to at least one Internet destination; and
  receiving a second traffic, at the second network NAP, the second traffic being generated by the second terminal when home registered on the second network and, based at least in part on the second traffic being generated by the second mobile terminal when home registered on the second network, sending the second traffic to the Internet for routing to at least one Internet destination.

17. A method according to claim 10, wherein the method further comprises:
  generating a first network effective roaming master key for a first mobile terminal home registered on the first network, and sending the first network effective roaming master key to the second network for delivery to the first mobile terminal, a wherein the first network effective roaming master key is encrypted based at least in part on a hash of a first network roaming master key and a first key ID; and
  generating a second network effective roaming master key for a second mobile terminal home registered on the second network, and sending the second network effective roaming master key to the first network for delivery to the second mobile terminal, a wherein the second network effective roaming master key is encrypted based at least in part on a hash of a second network roaming master key and a second key ID.

18. A method for mobile terminal roaming comprising:
  receiving a request for a visitor network configuration data, identifying as a requestor a mobile terminal registered to a home network management system;
  identifying a home network service plan for the mobile terminal;
  transmitting to the visitor network management system the home network service plan for the mobile terminal and the request for the visitor network configuration data;
  receiving from the visitor network management system a visitor network configuration data, corresponding to the request for the visitor network configuration data;
  transmitting the visitor network configuration data to the mobile terminal;
  detecting the mobile terminal exiting a coverage area of the home network management system and entry into a coverage area of the visitor network management system; and
  generating and transmitting the request for the visitor network configuration data.

* * * * *

UNITED STATES PATENT AND TRADEMARK OFFICE
CERTIFICATE OF CORRECTION

PATENT NO. : 11,272,350 B2
APPLICATION NO. : 16/829974
DATED : March 8, 2022
INVENTOR(S) : Oza et al.

It is certified that error appears in the above-identified patent and that said Letters Patent is hereby corrected as shown below:

In the Claims

Column 31, Claim 14, Line 28, "terminals" should be -- terminal --.

Signed and Sealed this
Twenty-fourth Day of May, 2022

Katherine Kelly Vidal
*Director of the United States Patent and Trademark Office*